(12) United States Patent
Zhang

(10) Patent No.: US 9,367,608 B1
(45) Date of Patent: Jun. 14, 2016

(54) SYSTEM AND METHODS FOR SEARCHING OBJECTS AND PROVIDING ANSWERS TO QUERIES USING ASSOCIATION DATA

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 55 days.

(21) Appl. No.: 14/214,955

(22) Filed: Mar. 16, 2014

Related U.S. Application Data

(63) Continuation-in-part of application No. 13/732,374, filed on Jan. 1, 2013, now Pat. No. 9,201,927, which is a continuation-in-part of application No. 12/573,134, filed on Oct. 4, 2009, now Pat. No. 8,370,129.

(60) Provisional application No. 61/682,205, filed on Aug. 11, 2012, provisional application No. 61/143,140, filed on Jan. 7, 2009, provisional application No. 61/802,757, filed on Mar. 18, 2013, provisional application No. 61/931,595, filed on Jan. 25, 2014.

(51) Int. Cl.
*G06F 7/00* (2006.01)
*G06F 17/30* (2006.01)

(52) U.S. Cl.
CPC ................................ *G06F 17/30657* (2013.01)

(58) Field of Classification Search
CPC .......... G06F 17/2785; G06F 17/30684; G06F 17/27; G06F 17/30663
USPC .......................................................... 707/730
See application file for complete search history.

(56) References Cited

U.S. PATENT DOCUMENTS

| | | | | |
|---|---|---|---|---|
| 5,151,857 | A * | 9/1992 | Matsui | G06F 17/30737 704/10 |
| 6,081,774 | A * | 6/2000 | de Hita | G06F 17/30663 704/9 |
| 6,847,966 | B1 * | 1/2005 | Sommer | G06F 17/3069 701/1 |
| 6,910,003 | B1 * | 6/2005 | Arnold | G06F 17/30616 704/1 |
| 6,986,104 | B2 * | 1/2006 | Green | G06F 17/2785 715/234 |
| 7,263,517 | B2 * | 8/2007 | Sheu | G06F 17/3043 |
| 7,409,336 | B2 * | 8/2008 | Pak | G10L 15/1822 704/10 |
| 8,370,129 | B2 * | 2/2013 | Zhang | G06F 17/30654 704/9 |
| 2004/0107088 | A1 * | 6/2004 | Budzinski | G06F 17/27 704/10 |
| 2006/0053156 | A1 * | 3/2006 | Kaushansky | G06F 17/30713 |
| 2014/0114649 | A1 * | 4/2014 | Zuev | G06F 17/289 704/9 |

* cited by examiner

*Primary Examiner* — Binh V Ho

(57) ABSTRACT

System and methods are disclosed for providing answers to search queries, and for searching using association data without requiring keyword matching. Datasets representing objects and their properties are created from unstructured data sources based on natural language analysis methods, and can be used to answer queries about objects or properties of objects. Implementations include general information search engines and embodiments for searching products, services, people, or other objects without knowing the names of such objects, or searching for information about known objects by using either keyword-based queries or natural language queries such as asking questions. System and methods are also provided for creating a structured or semi-structured representation of various unstructured data, in contrast to the conventional term-vector or term-document matrix representation.

18 Claims, 22 Drawing Sheets

Object or concept name:

Object or concept name:

| Terms | Parts of Speech | Grammatical Roles | Semantic Roles | Frequency Count |
|---|---|---|---|---|
| Computer | 0.002 | 0.0003 | 0.05 | 0.0004 |
| CPU | 0.001 | 0.0004 | 0.002 | 0.0002 |
| Memory | 0.004 | 0.0006 | 0.054 | 0.0003 |
| Hard disk | 0.006 | 0.0003 | 0.056 | 0.0004 |
| Software | 0.002 | 0.0003 | 0.058 | 0.0006 |
| …… | | | | |

Figure 10

|  | Computer | USB Drive | Keyboard |
|---|---|---|---|
| computer | 1 | 1 | 1 |
| CPU | 1 | 0 | 0 |
| memory | 1 | 0 | 0 |
| hard disk | 1 | 1 | 0 |
| operating system | 1 | 1 | 1 |
| software | 1 | 1 | 0 |
| …… | …… | | |

Figure 13A

|  | Computer | Intel | Microsoft |
|---|---|---|---|
| computer | 1.0 | 0.86 | 0.9 |
| CPU | 0.99 | 0.95 | 0.5 |
| memory | 0.95 | 0.5 | 0.4 |
| hard disk | 0.8 | 0.1 | 0.52 |
| operating system | 0.98 | 0.12 | 0.9 |
| software | 0.7 | 0.2 | 0.98 |
| …… | …… | | |

Figure 13B

| Terms in the Inverted Index | Postings for Each Term in the Inverted Index with concept names and association strength values |
|---|---|
|  |  |
| computer | {computer:1.0, desktop:0.75, Dell:0.7, ... Intel:0.86} |
| CPU | {computer:0.99, Intel:0.95, smartphone:0.92, ...} |
| memory | {computer:0.95, micron:0.95, Sandisk:0.85, ...} |
| hard disk | {computer:0.80, seagate:0.95, IBM:0.52, ...} |
| operating system | {computer:0.98, windows:0.85, UNIX:0.91, ... } |
| software | {computer:0.7, Microsoft:0.98, control:0.5, ... } |
| ...... | ...... |

SYSTEM AND METHODS FOR SEARCHING OBJECTS AND PROVIDING ANSWERS TO QUERIES USING ASSOCIATION DATA

CROSS REFERENCES TO RELATED APPLICATIONS

The present application is a continuation-in-part application of and claims priority to U.S. patent application Ser. No. 13/732,374 entitled "System And Methods For Quantitative Assessment Of Information In Natural Language Contents And For Determining Relevance Using Association Data" filed on Jan. 1, 2013, which is a continuation-in-part application of U.S. patent application Ser. No. 12/573,134, entitled "System and Methods for Quantitative Assessment of Information in Natural Language Contents" filed on Oct. 4, 2009, which is now U.S. Pat. No. 8,370,129. U.S. patent application Ser. No. 12/573,134 further claims priority to U.S. Provisional Patent Application 61/143,140, entitled "System and Methods for Quantitative Assessment of Information in Natural Language Contents" filed on Jan. 7, 2009. The present application also claims priority to U.S. Provisional Patent Application 61/802,757 entitled "System and Methods for Searching Objects Using Association Data" filed by on Mar. 18, 2013, the disclosures of which are incorporated herein by reference.

BACKGROUND OF THE INVENTION

Conventional keyword-based search methods are limited to finding results focused on the keywords. They are generally not able to find conceptually related objects or other information related to the keywords in the query. For example, if a user needs to search for a product or service, but the user only knows a feature or function of the product or service, without knowing the name of the product or service, conventional search methods may not be able to return a satisfactory answer. For example, if the query is "What are the products that can be used to take a picture?" or simply "take pictures", conventional search methods will face at least two challenges. One is to adequately understand the meanings of a natural language query, and the other is to find correct answers to the question. Conventional question-answering approaches require intensive manual work to build a knowledge base and have not been able to provide effective solutions for solving practical problems. More advanced and implementable technologies are needed to serve the ever-increasing information needs.

SUMMARY OF THE INVENTION

The present application describes additional embodiments of using the methods as disclosed in the parent patent applications of the present application, with a focus on the methods for question-answering as a search process, and for searching objects including products and services, based on the same methods as originally disclosed in the parent patent applications. For ease of reference, a major part of the referenced disclosures is recited below, together with the accompanying drawings.

In a general aspect, the present disclosure relates to a method for searching an object without knowing the object name, but with a property that is associated with the object.

In another aspect, the present disclosure relates to a method for searching a product or service without knowing the product or service name, but with a feature or function that is associated with the object.

In another aspect, the present disclosure relates to a method for searching a person or a company or other things in the world without knowing the name of the person, or the company, or the thing being searched for, but with a piece of information that is associated with the person, or company or the thing.

In another aspect, the present disclosure provides systems and user interfaces for searching such object without knowing the object name.

In another aspect, the present disclosure provides systems and methods for creating object-properties association datasets from unstructured data as a structured or semi-structured representation of the unstructured data, and enabling novel search method that can provide relevant information to the user in a much more effective way than a conventional document-based search method.

BRIEF DESCRIPTION OF THE DRAWINGS

In the following drawings, FIGS. 1 to 15 are recited from the reference disclosures, which are incorporated in and form a part of the specification, illustrate embodiments of the present invention and, together with the description, serve to explain the principles of the invention.

FIG. 1 illustrates an example of an object, its properties and their association strengths associated with the object.

FIG. 2 is an exemplified system diagram in accordance with the present invention.

FIG. 3 illustrates detailed steps for quantitatively assessing information in the specified document for the specified object in FIG. 2.

FIG. 4 illustrates another exemplified method for quantitatively assessing information in phrases and sentences.

FIG. 5 illustrates another exemplified method for quantitatively assessing information in a text content.

FIG. 7 is a system block diagram illustrating the components of the system that can be used to determine the relevance between one or more documents with a conceptual association dataset in accordance with the present invention.

FIG. 9 is a flow diagram illustrating the process of obtaining ETP values for terms from a plurality of external contents.

FIG. 10 is an example ETP dataset with hypothetical terms and their corresponding ETP score values.

FIG. 11 is an exemplified flowchart for determining the relevance between a text content and a concept represented by a conceptual association dataset in accordance with the present invention.

FIG. 12 illustrates the definition of zones using the data table in FIG. 1.

FIGS. 13A and 13B illustrate the structure of a term-concept or term-topic matrix.

FIG. 14 illustrates the structure of a term-concept or term-topic inverted index.

FIG. 15 illustrates an exemplar hierarchical structure of object or concept and properties association.

DETAILED DESCRIPTION OF THE INVENTION

The first part of the description recites or is based on a major part of the referenced disclosures for ease of reference. The additional descriptions for the additional embodiments are located in a later part of the description.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM asserts that an object can be uniquely defined by all its associated properties each of which carries a varying amount of information about the object.

Figure 1:
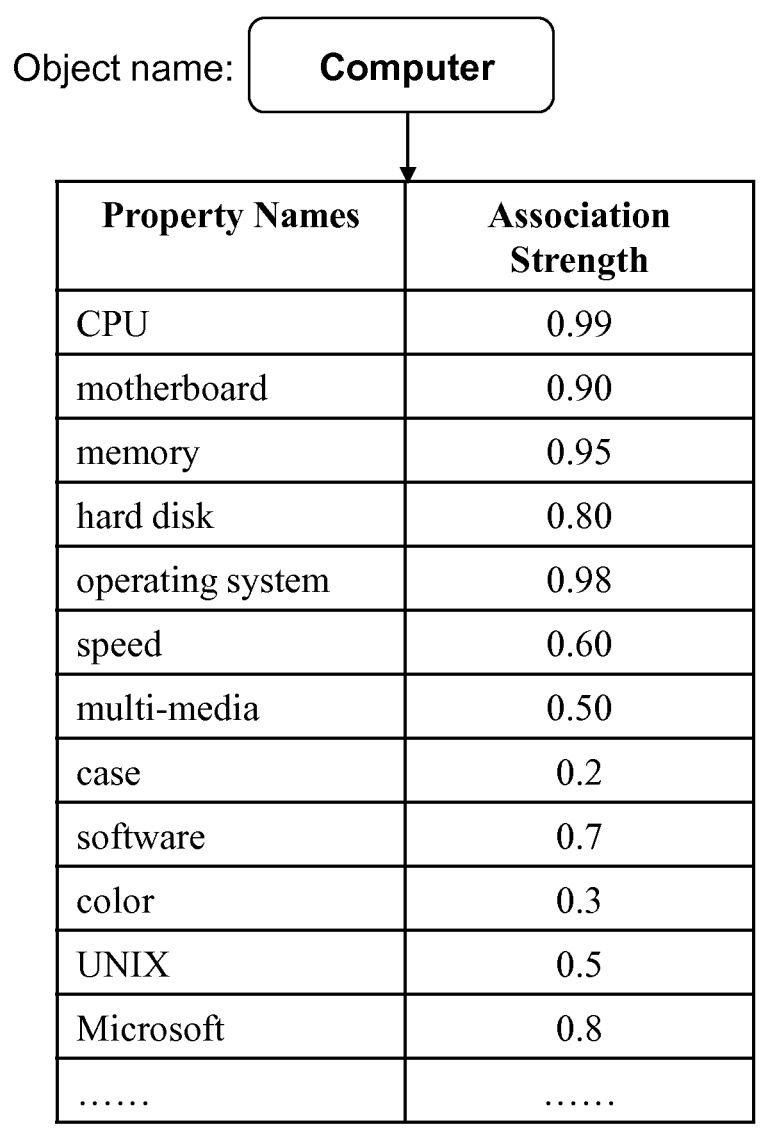

As an example, referring to FIG. 1, an object named "computer" is characterized by a plurality of associated properties such as "CPU", "motherboard", "memory", "hard disk", "operating system" . . . that are associated with the object "computer". The prominence of the association between "computer" and each of the properties is characterized by a numerical value herein called association strength. Hypothetical values for the association strengths for "CPU", "motherboard", "memory", "hard disk", "operating system" . . . can, for example, be 0.99, 0.90, 0.95, 0.80, 0.98 . . . , respectively. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, an abstract object, and can be represented by a symbolic name in a language such as a word, a list of words or a phrase, a character string, a query, a sub-component of a query, a topic, or the name of a document category or document class. In a more general sense, the term "object" can stand for an object class, including the concept of certain things, such as "computer" or "computers". When this is the case, the object class can have sub-classes, such as "desktop computers", and "notebook computers", or "Dell computers", etc. and each sub-class can have instances, such as a specific desktop computer. In the following description, the term "object" can refer to a class, a sub-class, or a specific instance of the object.

It should be noted that as the present disclosure involves natural languages, and makes references to certain grammatical terms such as a "sentence", and the "subject" and "predicate" of a sentence, and an "object" of a verb, and parts of speech. The term "object" used in the present disclosure in the context of the Object Properties Association Model (OPAM) is different from the grammatical term of "object" that refers to the object of a transitive verb, such as a noun or a pronoun, which may be in the accusative case in certain languages, as is used when describing new methods using grammatical analysis with parts of speech, in which case the term "grammatical object" or "verb object" may be used. In the context of the Object Properties Association Model (OPAM), the sense of "object" used is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a keyboard, as shown in FIG. 1. The property "CPU" having an association-strength of "0.99" is a more defining feature to the object "computer" than the property "case" that has an association-strength value of "0.2".

For ease of illustration, the terms of "defining power", "prominence", "importance", "association strength", etc., may be used interchangeably; and the terms "property" and "attribute", or "property value" and "attribute value", can also be used interchangeably, whenever appropriate.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."

1B "John is intelligent."

"John" is the subject of the sentences, while "is a student" and "is intelligent" are respectively the predicates of 1A and 1B.

In OPAM of the present invention, the predicate is interpreted as providing a piece of measurable information about the subject of the sentence. The OPAM model also states that human languages convey information in the basic form of stating that an object has certain properties, or an object is associated with certain other objects as being its properties or property values. The general information structure for a simple declarative sentence is "Object O has or is associated with Property P", or O+P, corresponding to the grammatical structure of "Subject+Predicate".

In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In OPAM of the present invention, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure.

In conventional grammar, a compound sentence is a sentence that contains two or more independent clauses, or non-embedded clauses, such as "John is a student, and Mary is a teacher." in which the two clauses do not contain each other. In the present disclosure, the term "complex sentence" refers to both the complex sentence and the compound sentence.

A document can include one or more paragraphs. Each paragraph can include one or more simple and/or complex sentences.

Given the information structure of a simple sentence as being "Object O is associated with Property P", the amount of information a linguistic content may carry also depends on which of the properties of the object is being associated with the object. Compare the following:

2A. "A computer has a CPU."
2B. "A computer has a case."

Sentences 2A and 2B may not convey new information about the object of computer to someone having basic knowledge about computers. When asked: "Which of the sentences is more informative about the object of computer?" however, the same person would very likely choose 2A as the more informative one. This example shows that for the same object and to the same receiver of a message, different properties carry different amounts of information about the object. In this example, "CPU" is a more defining feature than "case" for the object "computer".

The sentence "A computer has a CPU and a hard disk." contains more information about the object "computer" than the sentence 2A. A document consists of two sentences such as "A computer has a CPU. And it also has a hard disk." contains more information about the object of "computer" than a document that consists of only one single sentence such as "A computer has a CPU." This is the cumulative or incremental nature of the amount of information in a linguistic content.

In the presently disclosed system and methods, the information contained in a text document about an object is quantitatively assessed by analyzing sentences in the document. Each sentence can carry a different amount of information about a specific object.

As is shown above, judgment of the amount of information in a document can be subjective, or the measurement can be relative, depending on one's prior knowledge. In the presently disclosed system and methods, it is not required for the assessing system to have prior knowledge about the object. In some embodiments, the disclosed system and methods can assume an initial knowledge in the assessing system as a relative standard. In some other embodiments, in order to establish an absolute or objective standard for measuring the quantity of the information in a linguistic content, such initial knowledge is set to zero. Thus, in the example of a simple sentence, such as "Object O has property P", anything that can be a property of the object, or that can appear in the position of P is assumed to carry potential information of certain amount about the object O.

Figure 2:
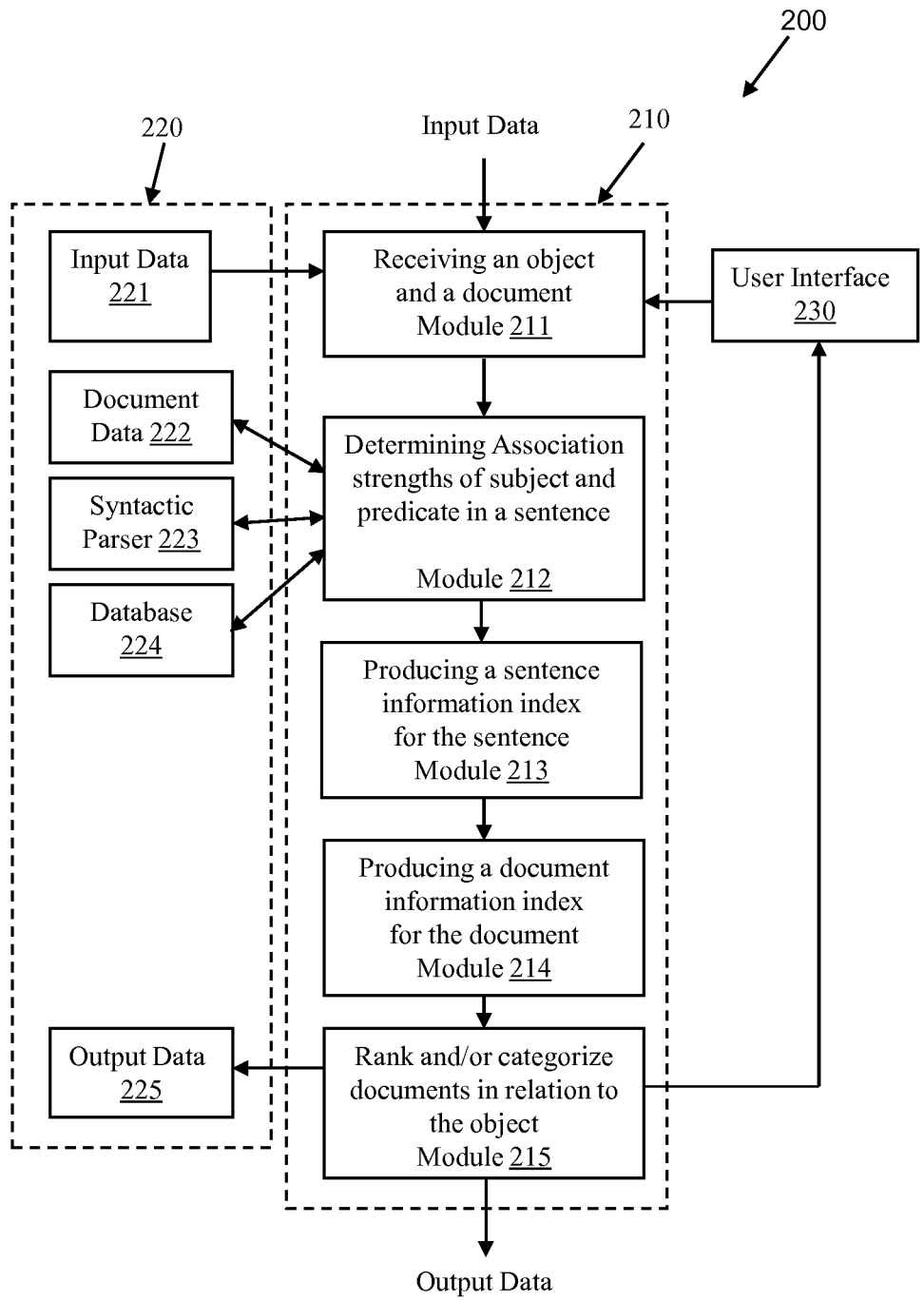

Referring to FIG. 2, a system 200 for quantitatively assessing information in natural language contents includes a computer processing system 210, a computer storage system 220, and a user interface 230. The computer processing system 210 includes algorithmic applications that further include functional modules 211-215 for conducting quantitative assessment of information in natural language contents. The computer processing system 210 can be implemented as, but not limited to, a central processing unit, an application-specific computer processor, a network server, and a group of computer processors. The computer processing system 210 can be implemented on a device that has computation power, for example, a personal computer, a portable computer, a mobile device such as a smart phone or a personal digital assistant, a computer network system comprising servers and processors that can provide information service to a remote server or client machine, and a cloud computing system. The computer storage system 220 can store, as described in more detail below, input data 221, document data 222 comprising one or more documents, optionally a syntactic parser 223, a database 224, and output data 225. The computer storage system 220 can be implemented in many types of storage media based on magnetic, optical, and mechanical properties, and nano materials, which can include a hard drive and an array of hard drives, flash memory, optical disks, and magnetic tapes. The user interface 230 can be provided, for example, by a program installed on a computer, a web browser, and an application for mobile devices.

The module 211 in the computer processing system 210 receives input data from an external source, input data 221 in the computer storage system 220, or input data from the user interface 230. The input source can include a query from a web browser, a search text string entered by a user at a user interface (e.g. 230). The input data includes an object name and a document. The object name can be in the form of a word, a list of words or a phrase, a character string, a sub-component of such string. The object can be a physical object or an abstract object. The object name can be obtained from the input string, which can be or can contain a query, a topic, or the name of a document category. The document can include any document that includes text in a language, such as a web page, a menu, a book, an email, a text message, an article, a dictionary, an instruction manual, etc. The module 211 can first receive a path to one or more documents, and subsequently retrieves the one or more documents according to the path. The document(s) can be stored in document data 222 in the computer storage system 220.

The computer storage system 220 can optionally include a syntactic parser 223. A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser 223 can be used to divide a simple sentence into a subject and a predicate. As it is known, a syntactic parser may not always produce a structural description of a sentence that conforms to the understanding by human language users. In some cases, a syntactic parser may fail to produce a meaningful description. Alternative approaches to the syntactic parser 223 are disclosed below to address such extreme cases.

In the present disclosure, the subject or the predicate in a sentence can be in the form of a single word, a string of words or a phrase, or an embedded clause.

The database 224 in the computer storage system 220 stores names or descriptions of a plurality of objects, each of which contains the names or descriptions of the properties for the respective object, and association-strength values of each property for the object. The object names, the property names, and the association-strength values can be stored in a table form, as shown in FIG. 1, or in other data structures such as shown in FIG. 6 A-B, FIG. 13 A-B, and FIG. 14-15. In the present invention, the association strength of a property to a given object is a measure for the amount of information that the property potentially carries for the object. The amount of information that is actually realized, to be discussed in detail below, can depend on the context in which the property term occurs. The above described database can be called a Knowledge Base because it stores knowledge about associations among objects and properties. The database 224 can be constructed automatically, semi-automatically, and/or by manual input. As discussed previously, the association strength for a property is dependent on the object of interest, thus the association strength can also be referred to as Object-Dependent Association Strength, or Object-Specific Association Strength; and a dataset representing an object can be referred to as an object-specific dataset.

Figure 3:
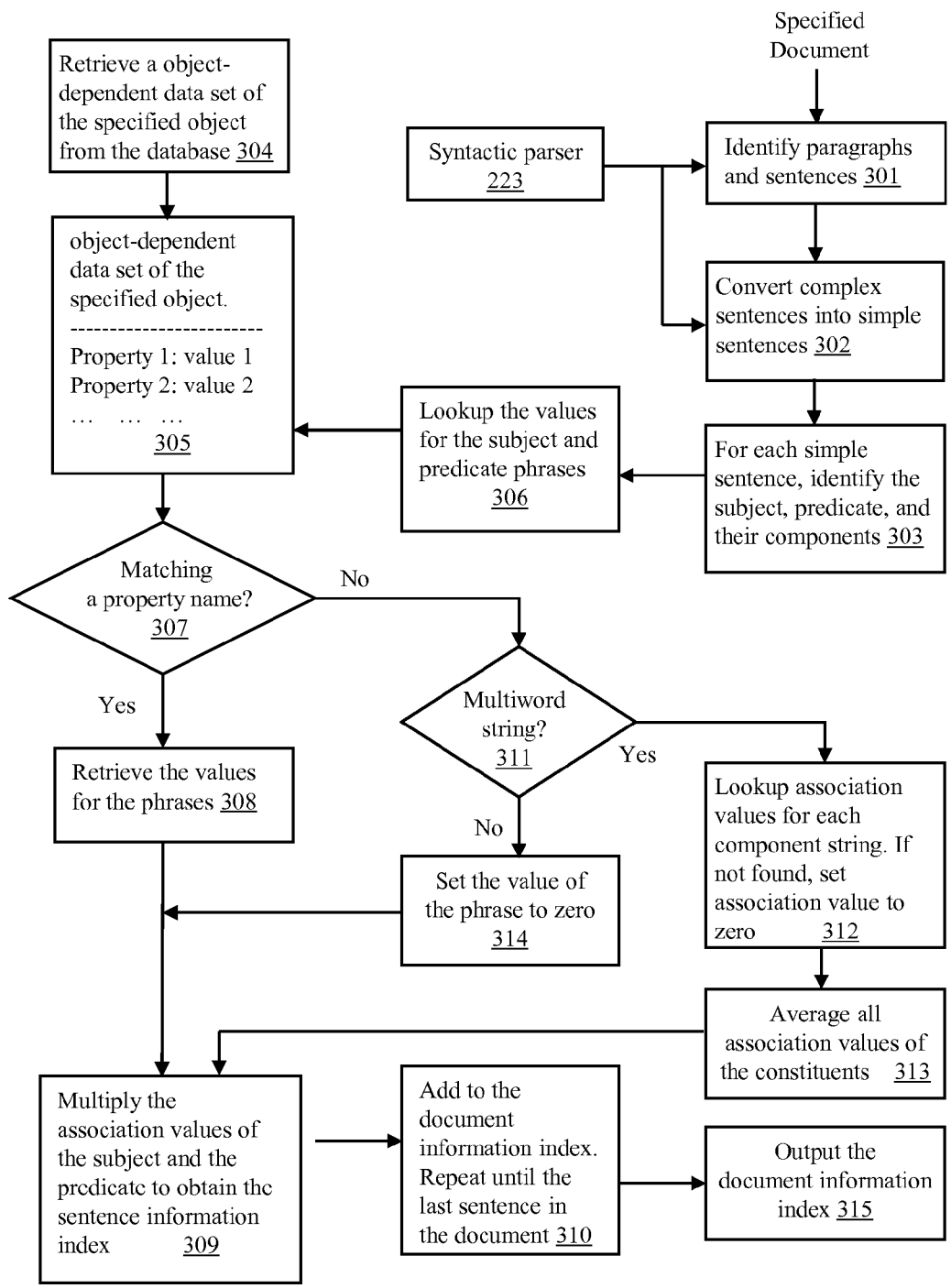

FIG. 3 illustrates detailed exemplar steps conducted by the modules 212-214 in FIG. 2. The syntactic parser 223 can be applied by the module 212 to parse the specified document to produce a list of paragraphs and sentences (step 301). Complex sentences in the specified document, if any, are next converted into simple sentences as described above (step 302). For each simple sentence, the module 212 identifies a subject and a predicate and returns two labeled text strings: a subject string and a predicate string (step 303). On the other hand, the module 212 retrieves an object-specific data set associated with the specified object name from the database 224 (step 304). The object-specific data set (305) includes a plurality of properties and corresponding association-strength values specific to the object. Next, the subject and the predicate obtained in step 303 are searched against the property names in the object-specific data set to determine if a property name in the object-specific data set matches or, in some cases, contains or is contained in the subject or the predicate of the sentence (step 306). If such a match is found for the subject or the predicate (step 307), the association-strength value for the subject or the predicate in the sentence is retrieved from the object-specific data set (step 308). The association-strength values of the subject and the predicate of the sentence are then multiplied to obtain a sentence information index by the module 213 in FIG. 2 (step 309). The sentence information index obtained in step 309 is added to a document information index by the module 214 in FIG. 2 (step 310).

As is described above, the association strength values of the subject and the predicate reflect the potential information they carry about the specific object. The mathematical operation of multiplying the two values together in step 309, in the present invention, is one of the means of realizing such information potentials in the context of a subject and a predicate. In addition, the mathematical operation of adding the sentence information index to produce a document information index (step 310) is one of the means of integrating the cumulative or incremental nature of the amount of information in a linguistic content as described earlier.

If no property name in the object-specific data set for the object name is found to match the subject or the predicate string of the sentence (step 307), the non-matching phrase string is analyzed to see if it is a multiword string (step 311). If the non-matching phrase string is a multiword string, the association strength of each of its components or sub-strings is looked up from the object-specific data set (step 312). If a match for a sub-string is found, the association-strength value for that sub-string is retrieved from the data set (step 312). If a match for a sub-string is not found, the association-strength value for that sub-string is set to zero (also in step 312). The association strength of the multiword phrase string can be derived by averaging the association-strength values of all the sub-strings (step 313), or by further analyzing the internal structure of the phrase using a syntactic parser (steps 420 to 470). The derived association-strength value of the multiword phrase string can be used to calculate the sentence information index (step 309). If the subject or the predicate phrase string is not a multiword string (step 311), the value of the phrase can be set to zero (step 314), which will produce a zero-valued sentence information index (step 309).

The steps 306-309 and 311-314 are repeated to the next sentence in the document until all the sentences in the document are analyzed (step 310). As described above, the amount of information in a linguistic content is cumulative or incremental in nature. The final document information index can be a sum of the sentence information index in the document, and is output by the module 214 to the module 215 as illustrated in FIG. 2 (step 315).

In some embodiments, the sentence information index can be obtained by using different formulae than the simple multiplication of the association-strength values of the subject and predicate of a sentence. For example, different coefficient values can be used for the subject and the predicate, respectively, when the two association strength values are multiplied, reflecting the weight difference in the subject position and the predicate position. The document information index also may not be a linear sum of the sentence information indices of the sentences in the document. The document information index can be non-linearly dependent on either the sentence information indices or the paragraph information indices which can in turn be non-linearly dependent on the sentence information indices in the document.

As is described earlier, a complex sentence is a sentence that contains other sentences or clauses as its components, and each such component clause can eventually be reduced to and expressed in the form of a simple sentence of Subject+Predicate. Thus, the information structure of Object+Predicate (O+P) of a simple sentence can also hold for the lower level clauses in a complex sentence, and the above described methods for simple sentences can be recursively applied to the components of a complex sentence, and the information index of a complex sentence can be produced by summing up the information indices of its component sentences, or by alternative formulae as described above.

A phrase in a language can be a simple phrase, such as a single word, or a complex phrase of multiple words. In linguistics, a complex phrase is usually a phrase consisting of a head and one or more modifiers of the head. For example, in the complex phrase of "digital cameras", the word "camera" is the head, and "digital" is a modifier. In the OPAM model of the present disclosure, the head is treated as the name of an object (or a class of similar objects), and a modifier is treated as the name of a property of the object or class. The complex phrase of "digital cameras" is the name of a subclass of cameras that all have the property of being digital in nature, and has the information structure of "an object (class) O that has the property of P. A head can be a multiword phrase, such as "New York", and a modifier can also be a multiword phrase, such as "North West" in a complex phrase of "North West New York". With the information structure of a complex phrase also being O+P, the above described methods for calculating the information index for a simple sentence can also be recursively applied to a complex phrase to produce the information index of the phrase by retrieving from the object-specific data set the respective association strength values for the head and the modifier, and then multiplying the two values, optionally with an coefficient as an adjustment for complex phrases as a special type of incomplete sentences.

A simple sentence with complex phrases as both its subject and predicate may have the information structure of "The object O that has property P has the property PP that has the property PPP", where the information structure of the subject of the sentence is "The object O that has property P", and the information structure of the predicate of the sentence is "has the property PP that has the property PPP".

Figure 4:
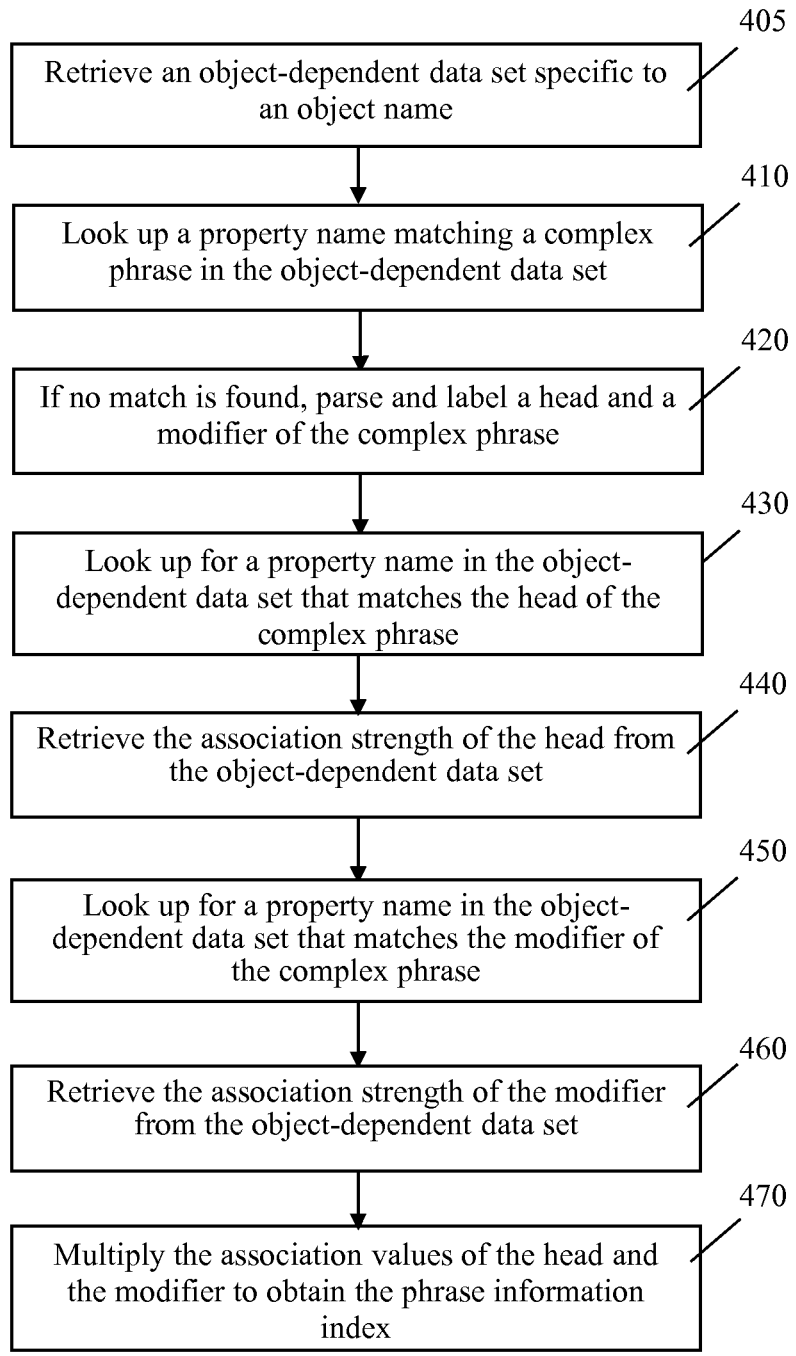

In some embodiments, referring to FIG. 4, complex phrases in a simple sentence can be analyzed using steps shown in FIG. 4 as an alternative to steps 311 to 313 in FIG. 3. An object name is determined and an object-dependent data set specific to the object name is retrieved (step 405). The object-specific data set, as described above, is specifically related to the object name. A property name is looked up in the object-specific data set for the complex phrase (e.g. "digital camera") (step 410). If a match is found, the complex phrase can be treated as a simple property name as discussed in steps 305-315. If no match is found, the complex phrase is parsed to a head (e.g. "camera") and a modifier (e.g. "digital") (step 420). Next, a property name is looked up in the object-specific data set that matches the name of the head of the complex phrase (step 430). The association-strength value for the head is retrieved from the object-specific data set (step 440). A property name is looked up in the object-specific data set that matches the name of the modifier of the complex phrase (step 450). The association-strength value of the modifier is then retrieved from the object-specific data set (step 460). The association-strength values of the head and the modifier are multiplied to produce the phrase information index (step 470), which can be a quantitative measurement of the amount of information contained in the phrase about the specific object, and which can also subsequently be used as the derived association strength of the phrase to the specific object to calculate the sentence information index, and then the document information index.

If the head or the modifier of a complex phrase does not find a match in the object-specific data set, and the head or the modifier is a multiword phrase, the parser can continue to analyze the components of the multiword phrases, and recursively apply the above method. However, the presently disclosed system and methods also provide alternative embodiments as described below.

The accuracy of syntactic parsers in general tends to decrease and the computation intensity tends to increase as the complexity of the sentence structure increases. In some cases, a syntactic parser can fail to produce a correct structural description of a complex phrase or a complex sentence. To handle these situations, the presently disclosed system and methods provide an alternative to the above described parser-based recursive structural analysis of complex sentences and complex phrases (as shown in steps 302 and 303 in FIG. 3, and 420 to 470 in FIG. 4). The alternative approach derives the association-strength value of a complex subject or predicate phrase by averaging the association-strength values of its component terms when an exact match of the complex phrase is not found in the database (shown in steps 311 to 314 in FIG. 3). In other words, instead of recursively applying the syntactic parser to label the internal structure of the two phrases, components in the subject and predicate phrases can be looked up in the object-specific data set without applying the syntactic parser to label the head and the modifier of the phrase. If the association-strength values of the components are found in the object-specific data set, then the average of the association-strength values can be used as the derived association strength for the subject or the predicate phrase.

For example, in response to an object name "computer" in a query, a syntactic parser returns the subject of a sentence as "The computer with 4 GB of memory" and the predicate of the sentence as "has a Unix operating system." A search in the object-specific data set for the object "computer" does not result in a match for either of the complex phrases. Instead of recursively applying a syntactic parser to identify the head and the modifier in the phrase, with the alternative approach, each word or combinations of words in the subject phrase "The computer with 4 GB of memory" are looked up for their corresponding association-strength values from the object-specific data set for the object "computer". The association-strength values for the seven component terms or for combinations of such component terms can be averaged to produce the derived association-strength value for the subject phrase.

Figure 5:
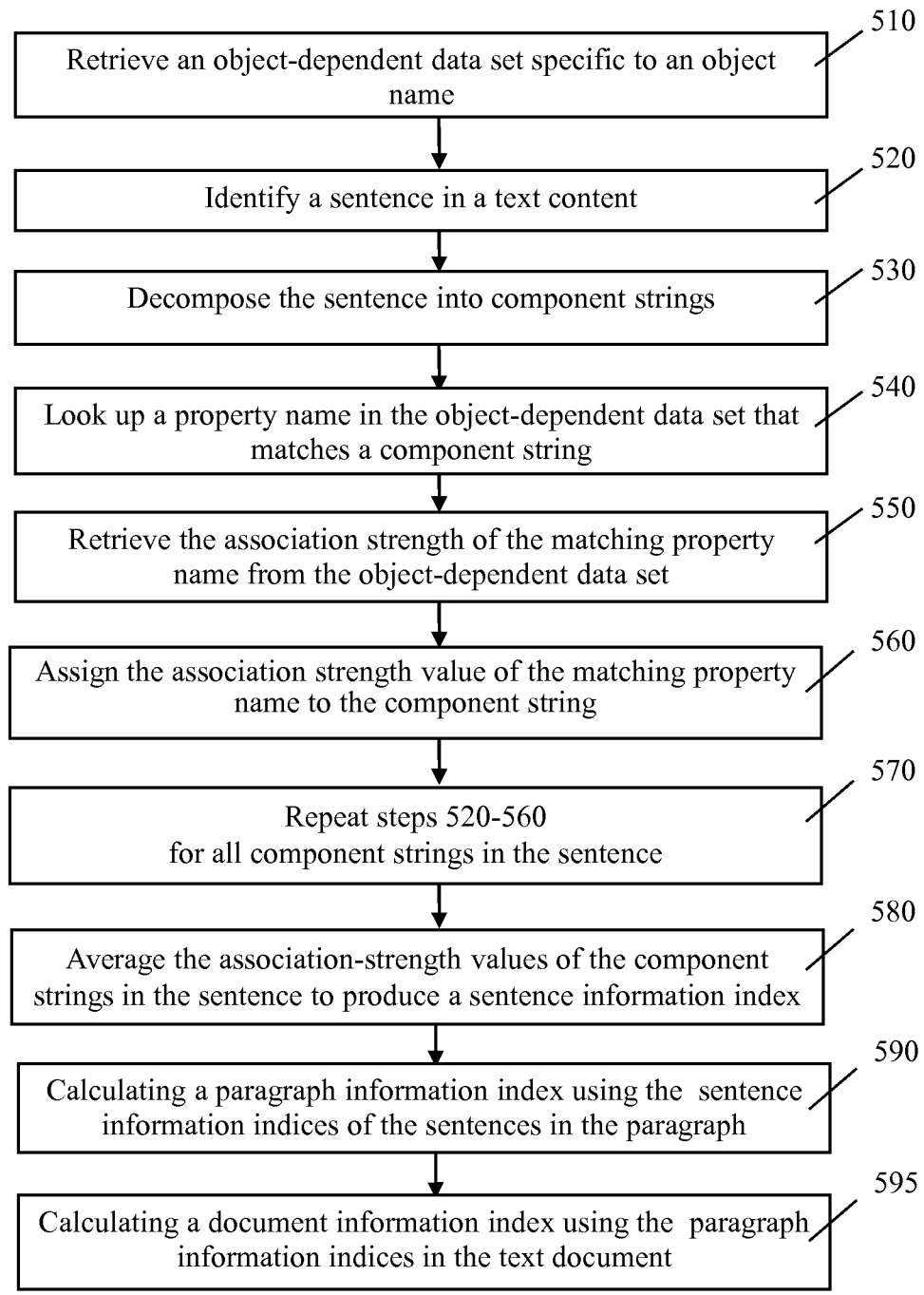

In some embodiments, the disclosed system and methods do not employ a syntactic parser. In this case, the subject and the predicate are not required to be identified in a sentence. Referring to FIG. 5, an object name is determined and an object-dependent data set specific to an object name is retrieved (step 510). A sentence is identified by appropriate punctuation marks of a text document in a natural language (step 520). A sentence is treated as a text string. The text string is decomposed into component strings (step 530). A component string can include a single word, a phrase, or combinations of word sequences of different lengths. For each such component string in the sentence, a property name matching component string is looked up in the object-specific data set (step 540). If a match is found, the association-strength value for the property name matching the component string is retrieved from the object-specific data set (step 550). The association strength value for the matching property name is assigned to the component string (step 560). Steps 530-560 are repeated for all component strings in the sentence (step 570). The association-strength values of such component strings in the sentence can be averaged to produce a sentence information index for the sentence (step 580).

In some other embodiments, instead of using the method of averaging, the method of multiplying the association strength values of two or more component strings or component terms can also be used, such as multiplying the association strength values of two terms that have the largest association strength values of all the component terms. In the case that only one of the component terms matches a property name, the association strength value of the matched component term can be used as is, or be adjusted to reflect the single-term status.

Furthermore, various coefficients, such as the relative positions of component strings in the sentence, can be used as the component string's weight to produce a weighted average. For each sentence in a paragraph, the sentence information index of the sentence can be added up to produce a paragraph information index for the paragraph (step 590). The paragraph information indices of the paragraphs in the text document can be added up to produce a document information index of the document (step 595). In some cases, the document information index can be calculated directly using the sentence information indices of the sentences in the text document.

In some embodiments when a syntactic parser is not used, the disclosed system and methods do not require a sentence to be identified by punctuation marks. The entire document or a paragraph is treated as a flat text string. The text string is broken down into component strings such as words and phrases, including combinations of word sequences of different lengths. Each such component string in the document or a paragraph is looked up in the object-specific data set. The corresponding association-strength values are retrieved. In addition to using a simple average of all the association-strength values of such component strings in the document or a paragraph as their respective information index, various coefficients, such as the frequency a component string occurs in the document or a paragraph, and/or the relative positions of component strings in the document, can be used as the component string's weight to produce a weighted average as the information index of the document or a paragraph. If a user prefers, paragraphs can be used as the text unit for information measurement; and the information index of each paragraph can be added up to produce the information index of the document. In certain cases, a document can have only one paragraph, and a paragraph can have only one sentence, or one or more character strings.

These methods have been found to be cost effective, especially when lower precision in the information measurements can be tolerated, such as in classifying documents into very distinctive classes, and can handle cases when the syntactic parser completely fails or when no syntactic parser is employed.

The disclosed system and methods can be applied to a number of areas such as document relevance ranking for search engines, automatic document classification or categorization of unstructured data, and providing contextual information for meaning or word sense disambiguation in natural language processing, machine translation, and speech recognition, etc.

Referring again to FIG. 2, the module 214 sends the document information index of one or multiple specified documents to the module 215 in the computer processing system 210. The module 215 can perform one or more of the following exemplified operations. The output data can be stored in output data 225 or to other external sources.

Document Relevance Ranking for Search Engines

Some conventional ranking algorithms are mainly based on keywords, links, or popularity, and do not make direct reference to the information structure in the document contents. The presently disclosed system and methods are capable of producing better relevancy-ranking results than such conventional algorithms. When a user issues a search query, it is interpreted in the presently disclosed system and methods as that the user is looking for information about one or more objects by stating the object names in the query. The presently disclosed system and methods can quantitatively measure the amount of information contained in each document in the document collection, and rank the documents by the amount of information they contain about the queried object, thus providing information to the users in a more accurate and effective way. The collection of documents can include the Web pages on the Internet, documents stored in a company, an organization, and on an individual user's computer.

In the module 215, if a query matches a single object name, documents in a collection can be quantitatively evaluated for this object name using the process described above. The document information indices thus obtained about the object name as queried in the search can be used as a quantitative measure of the degree of relevancy of the documents to the query. The documents can be rank ordered according to their document information indices in the search result in the output data, which can allow a user (i.e. the inquirer) to look at documents more relevant to his or her query first.

If a query does not match a single object name but contains multiple object names, the same document collection can first be evaluated against each object name contained in the query for the amount of information each of the documents contains about each of the objects, and then a combined score can be derived based on the information index of each document about each object as the relevancy score of that document to the query. The documents can then be rank ordered according to their combined score in the search result.

Document Classification

The presently disclosed system and methods can intelligently classify documents. Once the document information indices of documents are obtained by the module 214 and received by the module 215, documents with their document information indices above a set threshold can be treated as belonging to a category defined by the object name, and stored in the output data. For example, if the class object name is "computer" or "finance", all documents with their document information indices for the object "computer" above a pre-determined threshold can be classified into the "computer" category. Documents with document information indices for the object "finance" above a pre-determined threshold can be classified as belonging to the "finance" category. The thresholds for different categories (i.e. different objects) can be the same or different.

In the presently disclosed system and methods, a document can be classified into one or more categories based on the amount of information obtained by module 214 and received by module 215 for different objects that correspond to different categories. The object name used to classify documents can be the name of a document category, or a name related to a document category. Depending on the user preference of classification, and the pre-determined thresholds, a single document may or may not belong to multiple categories.

A well-defined category system can include mutually exclusive categories, such as a category system for computer operating systems, which can have mutually exclusive sub-categories of Windows, Macintosh, UNIX, etc. If a document is solely about Windows operating system, then it is likely to have a near-zero information index for the object name of UNIX or Macintosh, and will exclusively be classified into the category of Windows. However, if the document's main topic or content is about the differences between Windows and UNIX, then it is likely to have an above-threshold information index value for the object of Windows, and also an above-threshold information index value for the object of UNIX, and can be classified into both the categories of Windows and UNIX. This way, relevant information can be easily accessed from the respective categories.

Word Sense or Meaning Disambiguation in Language Understanding, Machine Translation, and Speech Recognition The presently disclosed system and methods can be applied to meaning disambiguation in computer understanding of natural language. A word in a natural language can have multiple meanings in that language. For example, the English word of "bank" can mean a bank as a financial institution, or the bank of a river. These words are ambiguous without context information. If a language understanding program only looks up its meaning from a dictionary, there are more than one potential candidate meanings to choose from. The machine is often faced with a decision about which meaning is the correct one for the context. In some conventional technologies, the decision is either based on a statistically obtained probability of the word as being used in the English language, a method that is not so reliable, or based on available context information, which is usually very difficult to obtain by machines alone.

The presently disclosed system and methods can effectively identify the most appropriate meanings of such words in their context. The context can be a phrase, sentence, a paragraph, or multiple paragraphs, or even the entire document. An information index for the sentence, or the paragraph or paragraphs, or the document for each meaning of the word can be computed. The word meaning having the highest score can be selected as the most appropriate meaning in that context.

For example, suppose the dictionary lists two meanings of the word "bank".

(1) A financial institution that handles monetary transactions.

(2) A raised boarder along a river.

If the sentence is:

(3) "The bank has enough money."

the presently disclosed system and methods can calculate sentence information indices for sentence (3) for both of the object name of "financial institution" and "river". The sentence information index will be much higher for "financial institution" than that for "river" because a term such as "money" in the sentence has a higher association-strength value for the object of "financial institution" than for the object of "river".

The above described meaning disambiguation can be applied to many areas. One such area is machine translation. As described above, a word or a phrase in a natural language may have more than one meaning. In order for a machine to properly translate a text content, a context is often needed to determine which of the multiple meanings of a word is the intended meaning or the most appropriate meaning. The presently disclosed system and methods can compute information indices for various contexts as exemplified above, and select the context that has the highest information index as the most appropriate meaning. The described meaning disambiguation methods can also be applied to computer-based natural language understanding and speech recognition to correctly identify the most appropriate meaning of a multi-meaning word or phrase, thus providing a solution to a key issue in these areas.

It should be understood that the above-described methods are not limited to the specific examples used. Configurations and processes can vary without deviating from the spirit of the invention. The methods for quantitative assessment of information in the natural language contents can be applied to areas in addition to the examples described above, including non-natural or artificial languages such as a computer programming language, or a symbolic system in which symbols that carry meaning are used. In the case of natural language, various types of sentence structures and phrase structures exist. While they are not exhaustively exemplified in the above description, the information structure of "Object+ Properties" and the corresponding information quantification methods as described in the present disclosure should apply to any type of sentence or phrase structure. The above described techniques can be separately applied or when appropriate, applied in combination.

Moreover, the association strength can be expressed in the form of a continuous scale of numerical values or in the form of discrete ranges. The values of association strengths can be in a range between 0 and 1, and/or in other ranges. It should be understood that information indices can be defined at different levels than the examples described above. In addition to document, sentence, and phrase information indices, information index can be defined and computed for paragraphs, a string of words, or other segments of text.

Additional Embodiments for Determining Relevance Using Association Data

As illustrated in FIGS. 1 to 5 above, the use of the object-properties association datasets provides a novel way for determining the quantity of information contained in a document, which is otherwise not possible with conventional methods of simple keyword-matching. An additional function of the above disclosed methods is to discover the content types or topics of a document, as well as the relevance between a text content and a specific topic or concept. The example of applying the linguistic information quantification method to relevance ranking of search results as described above is a specific application of the above-disclosed methods for this purpose. It is an example of determining relevance between the content of a document and a query via a conceptual association dataset associated with the object or concept represented by the query.

The functions of determining relevance between a text content and a concept or an object can further be extended to determining the relevance between a text content and any concepts or topics, as long as a conceptual association dataset for that concept or topic is available. In the present disclosure, more methods are disclosed for determining such relevance and for their applications in areas including search result ranking, document classification, word sense or meaning disambiguation, question answering, and relevant advertising, etc., as will be described below.

In U.S. Provisional Patent Application 61/682,205 titled "System and Methods for Determining Term Importance and Relevance Between Text Contents Using Conceptual Association Datasets" filed by the present inventor on Aug. 11, 2012, new methods are disclosed for determining the relevance between text contents using the conceptual association datasets based on the object-properties association model, and based on the grammatical or semantic attributes of the terms in the text content.

In the present invention, the object-specific dataset in the above disclosure is interchangeably referred to as a conceptual association dataset for ease of description of the applications of the methods that will be described below. And the term "object", "concept", and "topic" are also interchangeably used for different applications.

As was illustrated in FIG. 1, an example of a conceptual association dataset for the object or the concept of "Computer" contains a plurality of terms as the names of properties associated with the concept or object. Each property has a corresponding value indicating the association strength of the property with the object or concept of "computer". In FIG. 1, the exemplar property terms are mostly nouns or noun phrases representing names of other objects associated with the main object of "computer". In the actual applications, the property terms can include other types of phrases, such as a verb phrase like "have a CPU", "was invented many years ago", or a prepositional phrase like "with OEM parts", etc., or even sentences.

In U.S. Pat. No. 8,380,489 issued on Feb. 19, 2013, U.S. patent application Ser. No. 13/763,716 filed on Feb. 10, 2013, U.S. patent application Ser. No. 13/742,337 filed on Jan. 15, 2013, and U.S. patent application Ser. No. 13/802,427 filed on Mar. 13, 2013, system and methods are disclosed for creating such object-properties association datasets from unstructured data. These disclosures are incorporated herein by reference.

Figure 6A:
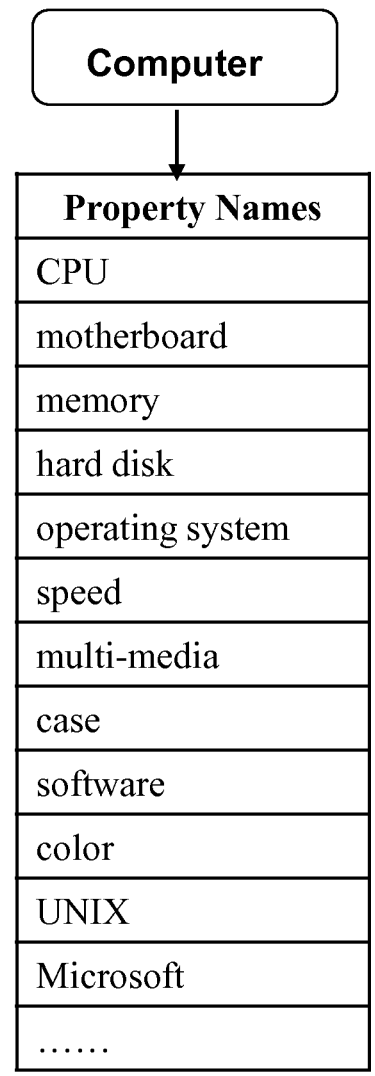
FIG. 6A shows an example of a one-column dataset adapted from FIG. 1.

In some embodiments, the column containing the numeric values that represent association strengths between the property terms and the concept can be optional. In some other embodiments, the association strengths for different property terms can be a constant (e.g. having a value of 1 for all property names). When this is the case, having a constant association strength value can be considered as being equivalent to having no association strength value, which is equivalent to only having property terms in the dataset without the association strength column. FIG. 6A shows an example of a one-column dataset adapted from FIG. 1. The dataset can still be used to determine the relevance between a text content and a concept or a topic.

Figure 6B:
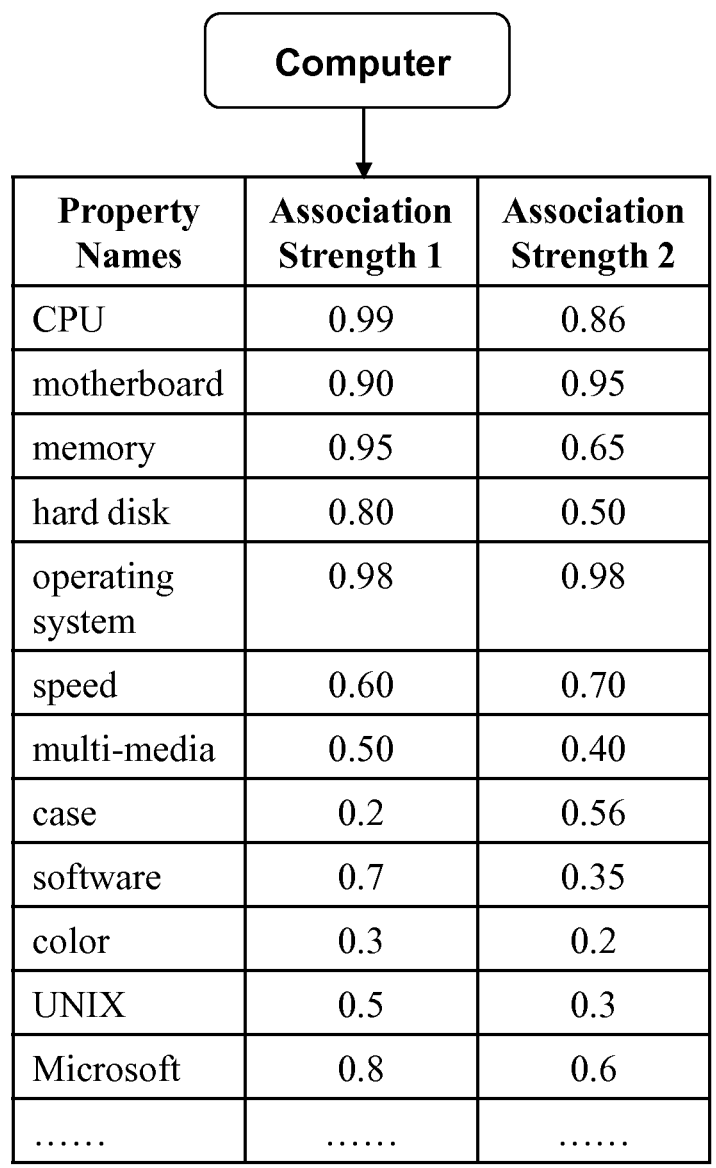
FIG. 6B shows an example of a multiple-column dataset adapted from FIG. 1.

In some other embodiments, the property terms in the dataset can have more than one column of association strength values, or other values related to the association strength. For example, some association strength values may be different depending on the specific context, such as a word or phrase being associated more or less strongly with the concept when the word or phrase is a verb of the subject of a sentence in which the subject represents the concept name, or when the word or phrase occurs in a specific region or position in the text content or in a sentence or paragraph, or in relation to some other words or phrases as its context. FIG. 6B shows an example of a two-column association strength value dataset adapted from FIG. 1. The values in the second column can reflect the context-determined strengths that may be different under different contexts.

In some embodiments, such multiple values of the same property term can be represented by a single variable, the value of which can be dynamically determined by a function based on the specific context type or conditions as independent variables in the function. For example, for the object named "camera", if the property name is "can take pictures", its association strength or importance measure to the object can be determined based on a number of factors including whether the dataset also contains specific property terms such as "under water", or whether the term is obtained from a training data sentence that contains other terms such as "camera", or "smart phone", or "tablet computer", or "at night", etc.

Figure 7:
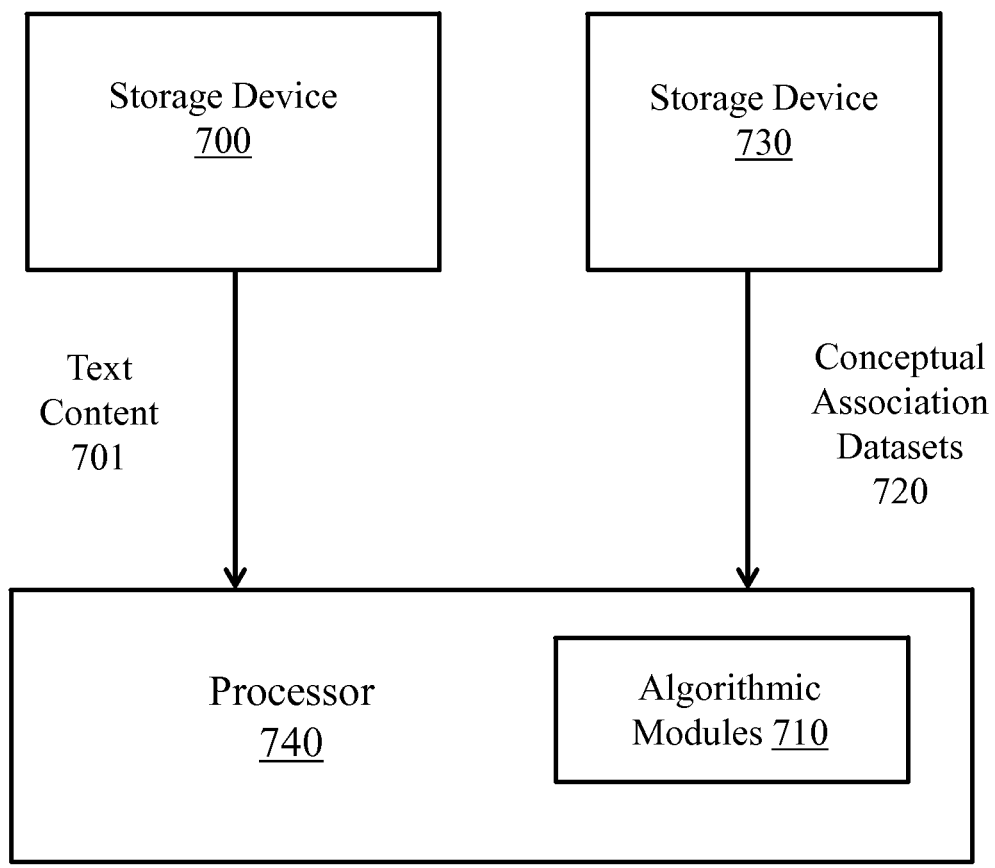

FIG. 7 illustrates a system that can be used to determine the relevance between a text content and a concept or a topic. A text content 701 is stored in storage device 700, and are input into processor 740. The processor includes algorithmic modules 710 that analyze the content of the text content. The processor further retrieves an object or conceptual association dataset 720 from a plurality of datasets from a storage device 730, each of such datasets being associated with a different object or concept or topic or attribute, and calculates a relevance score R between the text content and the dataset. If the relevance score R is above a pre-defined threshold, the processor outputs a signal indicating that the text content is relevant to the concept or topic, otherwise, the processor outputs a signal indicating that the text content is not relevant to the concept or topic. The system can take further actions with the relevance signal, such as to display a relevant document or email, etc., to the user, or display one or more names of the concepts or topics that are relevant to the text content, sometimes as answers to a question about the topic of the text content, or as a domain for suggesting an advertisement, etc.

In some embodiments, the system may check the relevance not by retrieving a single dataset at a time, but retrieving multiple datasets in a certain way or in a combined format, and concurrently checking multiple datasets to find the most relevant dataset that shows the highest relevance value for the text content being compared. As will be discussed later, in some embodiments, the multiple conceptual association datasets can be retrieved in the form of a table or matrix, with each individual dataset constituting a column or row of the table. In some embodiments, terms can be the first column in the table, and the corresponding association strength values with each concept or topic can be the rows of the table. And in some other embodiments, the multiple conceptual association datasets can be retrieved in the form of an inverted index, with each term being an entry in the index, and the corresponding association strength values represented in what is commonly known as a posting corresponding to that term. In some other embodiments, the multiple conceptual association datasets can be retrieved in the form of a hierarchical structure like a tree.

Figure 8A:
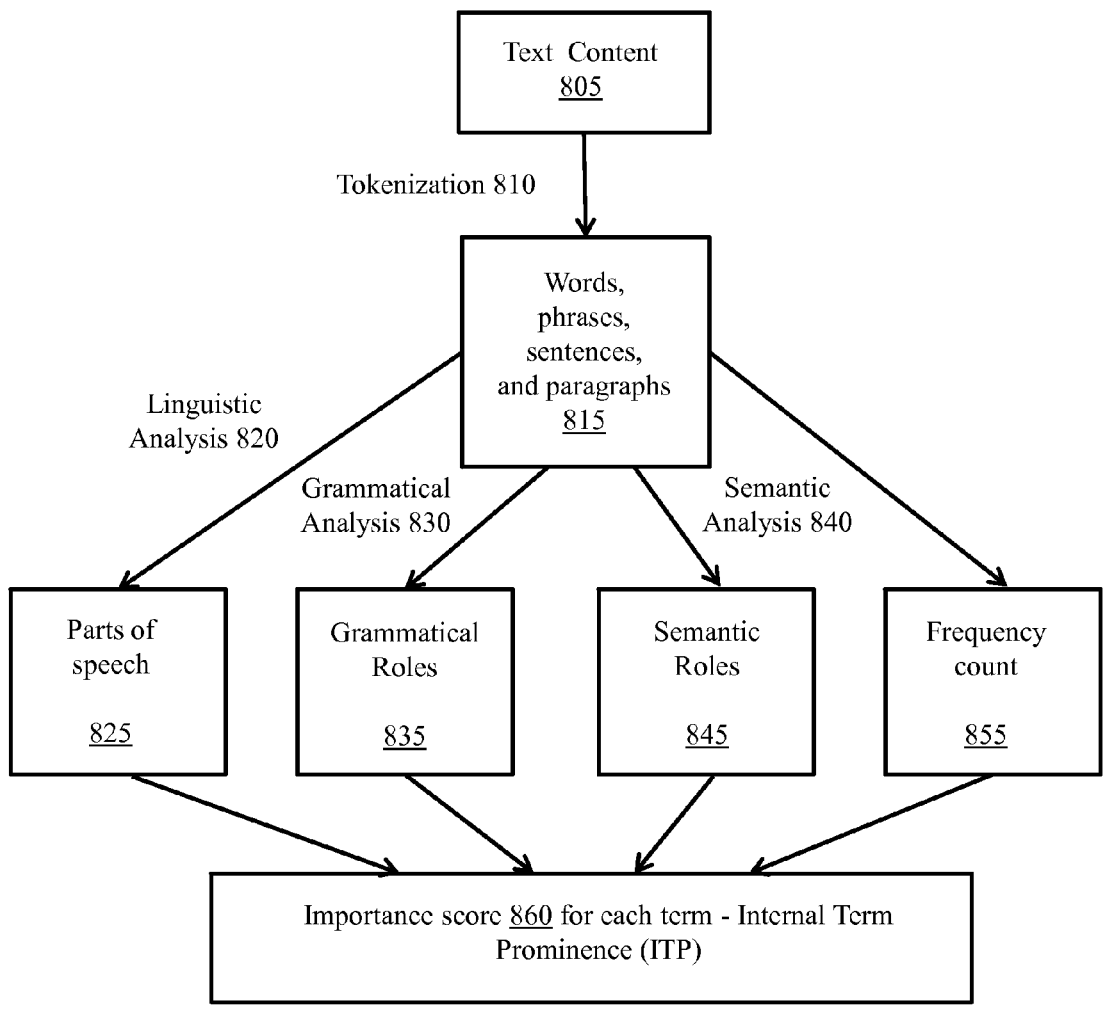
FIG. 8A is a flow diagram illustrating the steps of one embodiment of analyzing the text content.

The system first analyzes the text contents as they are input. FIG. 8A is a flow diagram illustrating the steps of analyzing the text content. In FIG. 8A, a text content 805 is first tokenized (810) into one or more tokens, each can include one or more words, phrases, and in some cases, can also include one or more sentences or even paragraphs, whenever applicable. Each token can be an instance of a unique term in the text content, which can have more than one token instance. For example, the word "camera" is a term, which can occur more than once in a text content, and each of its occurrence is a token instance of the term "camera". In the following description, the word "term" and "token" may also be interchangeably used when applicable.

For each term or its tokens 815, as an optional step, an importance is determined, and an importance score can be calculated based on a number of factors. Linguistic analysis 820 can be applied to identify the parts of speech of each word or phrase 825, such as a noun or a noun phrase, a verb or a verb phrase, an adjective or adverb, or a preposition or a prepositional phrase, a pronoun, etc. Then, optionally, grammatical roles 835 are identified (830) for words and phrases such as whether a noun is a subject of a sentence, or a direct or indirect object of a verb, or a head or a modifier of a multi-word phrase, etc. A sentence can also be identified as an independent clause, or a dependent clause of various types such as a relative clause or an adverbial clause, etc. Optionally, semantic analysis 840 can also be performed to identify the semantic roles or semantic attributes or attribute values 845 of these words or phrases such as whether a noun is referring to an actor or agent of an action, or a recipient of an action, or an instrument, or whether an adjective is referring to a state, or an attribute of something, or whether a term is the name of a product or service, or indicates a positive or negative opinion, etc. Furthermore, the frequency count 855 of each term or its tokens occurring in the text content is also obtained as an importance factor. Then, an importance score 860 of a term is calculated based on one or more of the operations in steps 810-855. The importance score 860 can also be referred as Internal Term Prominence (ITP) for ease of reference later.

In the present disclosure, the term "parts of speech" refers to the classes or categories of word or phrases as they are used in a sentence. In traditional grammar, each word in a sentence can be labeled with a class name such as a "noun", "verb", "adjective" "adverb", "preposition", "article" "conjunction" and other classes. In some embodiments, parts of speech are treated as a form of the grammatical attributes of a word or a phrase.

In one embodiment, the method for the calculation of the importance score is to simply count the frequency of each term occurring in the text content.

In another embodiment, the method is to first assign weighting coefficient values to the terms according to their parts of speech. For example, a noun or noun phrase may be assigned a weighting coefficient of 0.9, while a verb or verb phrase can be assigned a weighting coefficient of 0.7, or a preposition can be assigned a weighting coefficient of 0.2, or a pronoun or an article can be assigned a weighting coefficient of 0.1 (to indicate their relatively lower importance), and such values can be used as the importance score of the term.

In yet another embodiment, the method is to first assign weighting coefficient values to the terms according to their grammatical roles. For example, a term that is the subject of a sentence may be assigned a weighting coefficient of 0.9, while a term that is the predicate of the sentence can be assigned a weighting coefficient of 0.8; a term that is the head of a subject phrase (such as the word "camera" being the head of the phrase "digital camera") can be assigned a weighting coefficient of 0.6; a term that is a modifier of a subject phrase (such as the word "digital" being a modifier in the phrase "digital camera") can be assigned a weighting coefficient of 0.5; a term that is a head of a predicate phrase can be assigned a weighting coefficient of 0.4; and a term that is a modifier of a predicate phrase can be assigned a weighting coefficient of 0.3, etc., as its importance score.

As is described above, in some embodiments, both grammatical roles and parts of speech can be referred to as the grammatical attributes of a word or a phrase.

In yet another embodiment, the method is to first assign weighting coefficient values to the terms according to their semantic roles. For example, a term that is the "actor" of an action (such as the word "John" in "John broke the window") may be assigned a weighting coefficient of 0.9, while a term that is the "recipient" of an action (such as the word "window" in "John broke the window") can be assigned a weighting coefficient of 0.8; a term that is an "instrument" (such as the word "stone" in "John broke the window with a stone") can be assigned a weighting coefficient of 0.6; and a term that indicates a state or an attribute (such as the word "running" in "John is running") can be assigned a weighting coefficient of 0.4, etc., as its importance score.

In yet another embodiment, the method is to first assign weighting coefficient values to the terms according to their semantic attributes or attribute values. For example, a term that is the name of a product or service may be assigned a weighting coefficient of 0.9, while a term that indicates an interest such as "like", "interested in", etc., can be assigned a weighting coefficient of 0.8; a term that indicates a positive opinion such as "good", or "fantastic", etc., can be assigned a weighting coefficient of 0.6; and a term that indicates a negative opinion can be assigned a weighting coefficient of 0.5, etc., as its importance score.

In yet another embodiment, the method is to combine two or more of the above weighting coefficient values to produce the importance score of the term, such as when a term occurs as a noun in one instance, and as a verb in another instance, or as the subject of a sentence in one instance, and as the object in another instance.

In yet another embodiment, the method is to use one or combine two or more of the above weighting coefficients, and then to multiply the frequency of the term by the weighting coefficient value to produce the importance score of the term.

Figure 8B:
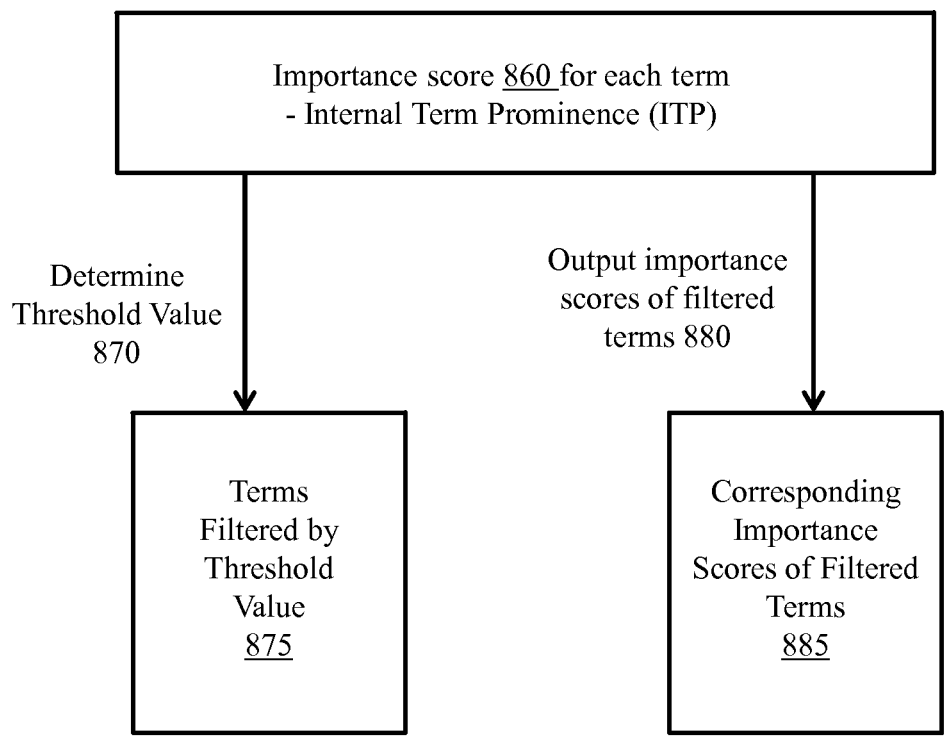
FIG. 8B is another flow diagram illustrating the steps of another embodiment of analyzing the text content.

Once the importance score 860 is determined, those terms having importance scores above a threshold can be selected and output to the next step (870) as illustrated in FIG. 8B. Optionally, the corresponding importance scores can also be output (880).

In some embodiments, the terms 875 selected (i.e. filtered by the threshold value) and output from the text content using the above described methods can be used as topic terms of the text content, or as a representation of the text content (870). Optionally, the corresponding importance scores 885 can also be output as part of the representation of the text content (880). As described, a text content can be anything that contains text of a language, including but not limited to a document, or webpage, or news or blog article, a social media comment, a book, a search query string, etc., and can reside on any computing or storage device including fixed or mobile computing or communication devices or cloud-based devices.

In some other embodiments, the importance score of a term can be further determined in combination with a corresponding score of the same term from one or more other text contents herein referred to as "external contents", and the corresponding score of the same term can be referred to as "External Term Prominence" score, or ETP, in short. In some embodiments, the external contents used for obtaining ETP score can be a collection of random text contents.

Figure 9:
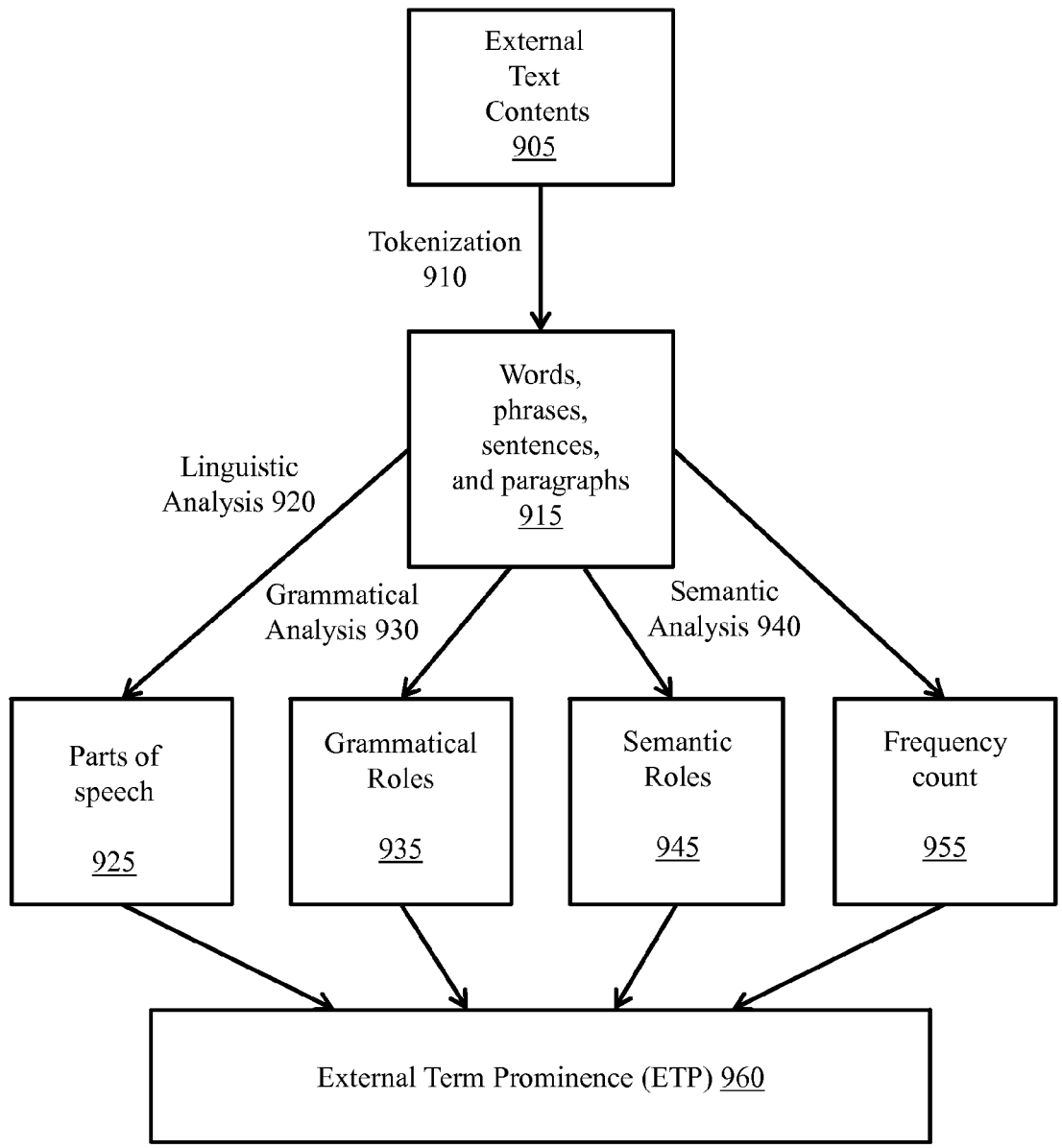

FIG. 9 is a flow diagram illustrating the process of obtaining ETP values for terms from a plurality of external contents using the similar steps as described in conjunction with FIG. 8A for each such external content, and then averaged by the total number of external contents used. When applicable, an external text content 905 is first tokenized (910) into words, phrases, sentences, and paragraphs. For each token comprising a word or a phrase 915, as an optional step, an importance score can be calculated based on a number of factors. Similar to the steps illustrated above in FIGS. 8A and 8B, linguistic analysis 920 can be applied to identify the parts of speech of each word or phrase 925, such as a noun or a noun phrase, a verb or a verb phrase, an adjective or adverb, or a preposition or a preposition phrase, a pronoun, etc. Then, optionally, grammatical roles 935 are identified through grammatical analysis 930 for such nouns or verbs and their phrases such as whether a noun is a subject of s sentence, or a direct or indirect object of a verb, or a head or a modifier of a phrase, etc. A sentence can also be identified as an independent clause, or a dependent clause of various types such as a relative clause or an adverbial clause, etc. Optionally, semantic analysis 940 can also be performed to identify the semantic roles or attributes 945 of these words or phrases such as whether a noun is referring to an actor or agent of an action, or a recipient of an action, or an instrument, or whether an adjective is referring to a state, or an attribute of something, or whether a term is the name of a product or service, or indicates a positive or negative opinion. Furthermore, the frequency count 955 of each term occurring in the text content is also obtained as an importance factor. Then, an external term prominence (ETP) 960 of a term is calculated based on one or more of the operations 910-955.

FIG. 10 shows an exemplified ETP dataset with hypothetical terms "computer", "CPU", "Memory", "hard disk", and "software", and their corresponding ETP score values for "parts of speech", "grammatical roles", "semantic roles", and "frequency count".

To distinguish from the external score, the original term importance score obtained from the text content using the steps as described in FIGS. 8A and 8B can be named "Internal Term Prominence" score or ITP in short.

When ETP score is used for determining the term importance score in a text content, in some embodiments, the final score can be determined by the following formula, wherein S_j denotes the final term score of the j-th term in a plurality of terms in the text content.

$$S\_j = ITP - ETP \quad \text{Eqn. (1)}$$

In some other embodiments, the final score of S_j for the j-th term in the text content can be determined by the following formula.

$$S\_j = ITP*ITP*/(ITP+ETP) \quad \text{Eqn. (2)}$$

Optionally, a normalization method can be applied to make the final score within a specified range when desired.

The methods of determining the term importance based on the grammatical attributes and internal and external term prominence are also disclosed in U.S. patent application Ser. No. 12/972,462 entitled "Automated Topic Discovery in Documents" filed by the present inventor on Dec. 18, 2010 and U.S. patent application Ser. No. 12/782,545, entitled "System And Methods for Automated Document Topic Discovery, Browsable Search and Document Categorization" filed on May 18, 2010 by the present inventor, and the disclosures of which are herein incorporated by reference.

Once the importance score is determined in combination of ETP by using Equation 1 or Equation 2, a threshold can be defined such that only those terms with importance scores above the threshold can be selected and output to the next step like in 870. And optionally, the corresponding importance scores can also be output like in 880.

In the same manner as with ITP scores as described above, in some embodiments, the terms selected and output from the text content using the above described methods can be used as topic terms of the text content for various purposes, or as a representation of the text content like in 870. Optionally, the corresponding importance scores can also be output as part of the representation of the text content like in 880.

As is described above, calculation of importance scores for tokens in the text contents is optional, but can provide the benefit of more accurately determining the relevance. For illustrative purposes, most of the following examples are based on embodiments that calculate the importance scores for tokens in the text contents using one or more of the factors as illustrated above. It should be noted that such importance scores are optional for the purpose of using the methods of the present disclosure to determine the relevance between a text content and a concept or topic or a dataset representing a concept or a topic or an object, etc.

Figure 11:
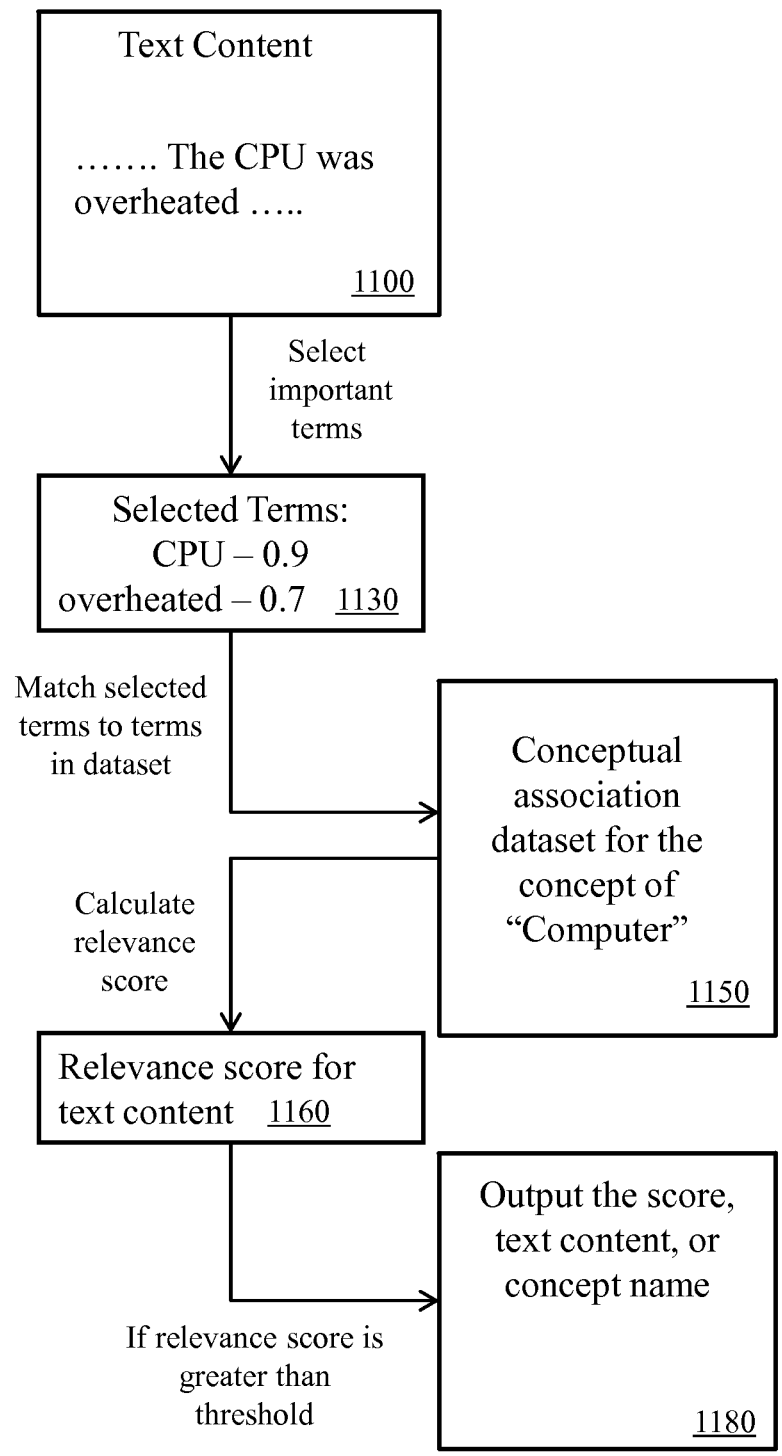

As described above, the conceptual association datasets are concept specific. Each different concept has its own association dataset. FIG. 11 illustrates exemplified steps for determining relevance between a text content 1100 and a concept or a conceptual association dataset 1150 using a conceptual association dataset. Using the concept "Computer" as an example, property terms and their association strengths relative to "computer" are shown in FIG. 1. As described earlier, use of the varying association strengths are optional, but can enhance the accuracy. In some cases, association strengths are constant.

FIG. 11 illustrates an example of determining the relevance between a text content and a concept using the conceptual association dataset. For a text content that contains such text as "The CPU was overheated", important terms selected from the text 1130 include "CPU" (with a hypothetical importance score of 0.9), and "overheated" (with a hypothetical importance score of 0.7).

The terms from the text content is matched with a conceptual association dataset 1150. An example of the conceptual association dataset 1150 is shown in FIG. 1. In this example, there is a match for the word "CPU", but no match for the word "overheated".

In some embodiments, the relevance score 1160 between the text content and the conceptual association dataset in this example can be determined to be 1 for one match, and can be incremented to 2 if the word "overheated" also had a match.

In some embodiments, the frequency of the matching term in the text content can also be used to determine the relevance score 1160 between the text content and the conceptual association dataset by adding the frequency of the matching terms to the total count. In this example the frequency of the matching term "CPU" in the text content is 1 for one occurrence of the word "CPU", but can be more than 1 in text contents other than this example.

In some embodiments, the relevance score 1160 between the text content and the conceptual association dataset in this example can be determined to be 0.9 based on the term's importance score in the text content 1100, and can be incremented to 0.9+0.7=1.6 if the word "overheated" with its term importance score being 0.7 also had a match.

In another embodiment, the relevance score 1160 between the text content and the conceptual association dataset in this example can be determined to be 0.99 based on the association strength value of the property term of "CPU" (as shown in FIG. 1) that matches the term from the content 1100, and can be incremented by another association strength value of "overheated" if the word "overheated" also had a match.

In another embodiment, the relevance score 1160 between the text content and the conceptual association dataset in this example can be determined to be 0.9*0.99=0.891 if the term importance score is multiplied by the association strength of the term "CPU" in the dataset, and can be incremented if there were 2 or more matched terms.

In another embodiment, the relevance score 1160 between the text content and the conceptual association dataset in this example can be determined to be 0.9+0.99=1.89 as the sum of the term importance score and the association strength of the term "CPU" in the dataset, and can be incremented if there were 2 or more matched terms.

Users have the option to use one or more of these scores as a measure of relevance. For a hypothetical threshold value of 0.2, the text content 1100 is considered to be relevant to the concept of "Computer" since all its scores are above this threshold.

The different embodiments described above based on term importance score provide different ways for determining the relevance. They involve different degrees of complexity in terms of implementation, and can produce results with different degrees of precision. Based on the experimental data from the present inventor, embodiments such as those that do not involve grammatical or semantic analysis require less processing, and are easier to implement, and are suitable for use cases where high precision is not required, while those embodiments that involve grammatical or semantic analysis can produce more accurate results.

The accuracy of determining the relevance based on matching the words or phrases in the text content with the words or phrases in the dataset can further be enhanced when more contextual information or more grammatical or semantic information is utilized than in the methods described above.

In some other embodiments, the text content is first divided into a plurality of segments, such as one or more words or phrases or sentences or paragraphs, etc. Tokens in each segment are checked with the dataset. Instead of counting the total number of tokens that match a property term, a method in which context information is mostly lost, a better method is to count the number of segments that contain at least one matching token. The total number of segments that contain at least one matching token can be used for the calculation of the relevance score, or it can also be divided by the total number of segments in the text content.

In some embodiments, the type of segments can also be used as a factor for determining the relevance score. For example, a weighting co-efficient can be determined based on whether the segment being checked is a phrase, or a sentence, or a paragraph, etc., or whether two or more matching tokens are in the same phrase, or sentence, or paragraph, etc.

In some embodiments, the number of matching tokens in a segment can be used to first determine a relevance score for the segment. The relevance score of each segment can be summed up to a total score in certain way. In some other embodiments, the total score can be divided by the total number of segments in the text content, or in relation to the number of non-matching tokens in the segment.

In some embodiments, the relevance score can also be determined based on the position of a sub-segment containing a matching word or phrase in the text content, or the position of the matching tokens in the segment, based on the same principle that words or phrases in different positions in a segment or the text content can carry different amounts of information, or different degrees of information focus.

In some embodiments, the contextual information can also be used in combination with the association strength values of the matched property terms, similar to the way they are used as illustrated with FIG. 11 above.

When more contextual information is available, such as the grammatical roles or parts of speech or semantic attributes of the tokens that match a property term, higher accuracy can be achieved. For example, as is also illustrated in the referenced disclosures, if the word "CPU" is the subject of the sentence, and the word "overheated" is the predicate or part of the predicate of the sentence, and if both words have a match in the conceptual association dataset, then the relevance score can be a much larger value than in other cases to indicate that what the sentence is talking about is closely related to the topic or concept or object of "computer", etc.

Furthermore, as illustrated in FIG. 6B, in some embodiments, the property terms in the dataset can have multiple association strength values corresponding to specific context, such as whether the property term occurs as a noun, or a verb, or in relationships with other terms, etc. When such data are available, the methods described above can be used with such data for more accurate results based on more context information.

In some embodiments, the above-described methods for determining the relevance score between a text content and a dataset can further be combined with the methods disclosed in the referenced disclosures such as illustrated in FIGS. 1 to 5. For example, the relevance score of the text content can be determined by multiplying the association strength value of a property term that matches a subject of a sentence and the association strength value of a property term that matches the predicate or part of a predicate of the sentence, or by multiplying the association strength value a property term that matches a modifier of a multi-word phrase and the association strength value a property term that matches the head of a phrase. This method can be used with or without other co-efficients for their respective grammatical or semantic attributes; and calculation methods other than multiplication can also be used.

In some other embodiments, instead of distinguishing the subject and predicate in a sentence, the relevance score of a sentence can be calculated by multiplying two or more of the largest association strength values among the property-matching terms in the sentence, or the association strength values of two or more of the terms with the largest term importance scores in the sentence, which can be determined using any of the above methods.

Figure 12:
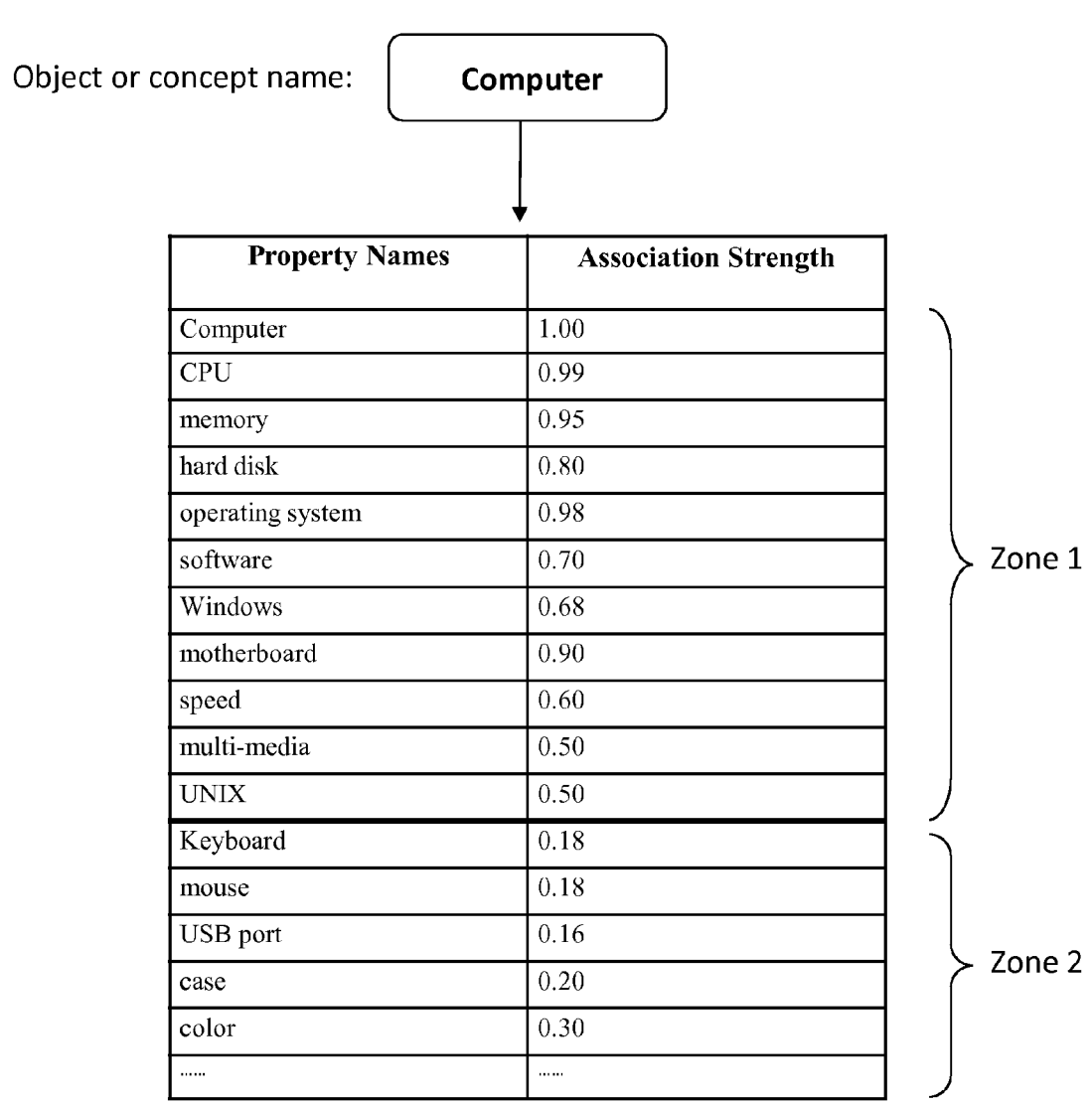

In some embodiments, the conceptual association dataset is divided into zones as shown in FIG. 12. One of the criteria for dividing the dataset into zones can be based on a property term's association strength value being above a predefined threshold value and below another threshold value, or based on other factors that are determined by the users for specific purposes. When such zones are defined, the relevance score of a text content can be determined by how many terms in the text content are matched with property terms in different zones. For example, for a text content of "The keyboard requires a USB adapter", the term "keyboard" has a matching property term in zone 2 in FIG. 12. The relevance score between the text content and the conceptual association dataset can be 1 for one match only. However, in this case with the matching property terms in zone 2, the user can apply a coefficient value such as 0.6 to the score to indicate that the match is in zone 2, and thus may have a lower relevance. Alternatively, the user can apply a coefficient value such as 1.2 to the score to indicate that the match is in zone 2, and thus may indicate that the contents are relevant in terms of specific properties of the concept of "computer".

When zones are used, the calculation can also utilize term importance score or association strength values as additional factors to determine the relevance score similar to the methods described above when zones are not used.

In some embodiments, when the matching terms are distributed in different zones of the conceptual association dataset, the relevance score can be a function of the count of matching terms in the different zones, or the scores calculated from the terms in the different zones as described above.

Similar to the examples in the referenced disclosures, the presently disclosed methods can be applied to many areas, including concept-based document search and result ranking, document classification, spam email filtering, word sense or meaning disambiguation, question answering, user intent detection and advertising, job search, etc.

In some embodiments, the relevance score between a text and the concept or topic can be used to classify or categorize the text content into a document class or a category or a topic of interest defined by the association dataset. Users can pre-determine a threshold, and if the relevance score between the text content and the concept or topic is above the threshold, the text content can be considered being a member of a category, or being about certain topics represented by the concept. For example, with their relevance score to the concept or topic of "computer" being above the threshold, the contents in the example sentences above can be both recognized as being about the topic of "computer", or can be associated with a document class of "computer".

A special case of document classification is what is known as spam email detection and filtering. The present invention can also be applied for this purpose. A dataset containing terms that are related to known spam emails can be obtained by various ways. An email can be checked against the dataset using one or more of the methods described above, in addition to certain conventional methods that do not perform analyses such as grammatical and semantic analysis. If the email is found to have enough relevance with the dataset representing a spam email, appropriate actions can be taken to filter the email from non-spam emails.

In some embodiments, the present method can be used in concept-based document search and relevance ranking. For example, if the query is "computer", documents that do not necessarily contain the keyword "computer", but contain content such as "The CPU was overheated", or "The hard disk still has plenty of free space", etc, are conceptually relevant to the query. Conventional search methods based on keywords match will not be able to find such documents as relevant documents to the query. However, using the present methods, in processing the query, a conceptual association dataset related to the object or concept or topic of "computer" can be retrieved, such as the example in FIGS. 1, 6A-B, and 13-15, which can contain conceptually related property terms such as "CPU", "hard disk", etc. Even a simple count of the matched terms can provide a quantitative measure of the relevance between the document and the query, and the document can not only be retrieved in a search result, but can also be ranked by the relevance score calculated using the present methods as described above.

In some embodiments, the present method can be used for providing context information for identifying the contextually appropriate meaning or sense of words or phrases that have multiple senses or meanings. In the same way as described above in the referenced disclosure with the example of the word "bank", the two meanings or senses of the English word of "bank" as a financial institution, or as the bank of a river can be disambiguated using the present methods with available context information. Using the previous example from the referenced disclosure, if the content is "The bank has enough money", the presently disclosed methods can calculate the relevance between the content and the object or concept of "financial institution" and "river", using corresponding datasets. The relevance score will likely be much higher for "financial institution" than that for "river" because a term such as "money" in the content is more likely to have a match with a property term associated with the object or concept of "financial institution" than for the object or concept of "river".

In some embodiments, the present method can be used for providing answers to questions as a special form of information search. For example, if the question is "In which city is Golden Gate Bridge located?", in answering the question, the system can retrieve one or more object-properties or conceptual association datasets, such as a dataset related to the topic or concept of "San Francisco", which is likely to have property terms such as "Golden Gate Bridge", "city", etc. Using the present method for calculating a relevance score between the question in the form of a query text string and the datasets, an appropriate answer, such as "San Francisco", can be provided to the question. In this application, a search query is a special type of text content, and the methods for determining the term importance as described above can be applied to determine which term in the query may be more important than others for a search task, and property terms in a dataset can be matched for calculating the relevance between the query and the topic or concept or object represented by the dataset, and the name or description of the topic or concept or object can be used as an answer.

In addition to the term importance score and matching the property names, when the association strength values are available for the property names in the association dataset, the relevance between a query and a dataset representing an object or a product or service can further be determined based on the association strength of the matched property names. For example, a query text such as "play multi-media file" can be relevant to multiple concepts or objects. If the property name of "multi-media" has an association strength value of 0.5 in a dataset representing the concept or object of "computer", and a value of 0.9 in another dataset representing the concept or object of "media player", then these values can be used in determining the relevance score of the concept or object in relation to the query or the question, and the search results can be properly ranked by their relevance, similar to document search and ranking described above.

In addition to providing answers based on the relevance of the query text to a topic or concept, the methods of the present disclosure can further be used in detecting user interest or intention. For example, if a user posts a comment on a social network or in an email or chat message such as "We will visit San Francisco next week, and will go to New York next month", this expression can be treated as a text content, and can be compared with one or more association datasets using the above-described methods. If the dataset for the concept or topic of "travel" is available, then it will likely contain such property terms as "visit", "San Francisco", "New York", "go to", etc., and with or without additional contextual information based on the grammatical or semantic attributes associated with the words or phrases in the expression, the comment will likely be recognized as being relevant to the topic of "travel". Thus, it can be inferred that the user is interested in travelling or likes the activity of travelling. Even though the user may have not explicitly disclosed in his/her user profile about this interest, and even though the user's expression does not contain the word "travel", the user's interest and intention can still be detected, and can be used for accurate advertising or other purposes.

In some embodiments, the presently disclosed system and methods can further be used to build a user profile for advertising and other purposes based on detected user interest. For example, if a user expressed his/her travel plans and experiences in different place over a period of time, such as in the above examples with San Francisco/Golden Gate Bridge, etc., even though the specific places and time the user mentioned about his/her travel plans/experiences are different, such as one time for New York, and another time for Los Angeles, etc., when the concept of "travel" or a related concept is often found to be relevant to the user expression, a dynamic user profile can be built based on the frequency of such relevant concepts being invoked, and relevant advertisements can be displayed to the user even when the user is not specifically saying something about travel.

A related area where the present system and methods can achieve effective and economical results is in Internet-based, or social network-based, or local computer-based, or mobile device-based advertising. In the conventional context-based advertising, advertisements are displayed based on user activity or the user generated text contents as a source of information about what the user is interested in or intends to do, and then using this information as the context such that relevant advertisements can be displayed based on user's current or past interest or intention. While this method is more effective than non-context-based advertising for both consumers and advertisers, conventional methods are still mainly based on matching the keywords that occurs in the user generated text contents or web sites that the user visits and keywords that the advertisers pre-define as being relevant. A disadvantage of such conventional methods is that many relevant contexts can be missed because of the lack of keyword match.

For example, if a search query, or a user comment on a social network, or an email or an online chat message, or an SMS message, or a transcript from an audio or text conversation, etc., contains such words as "San Francisco hotels", advertisements from hotels in the San Francisco area may be displayed. However, if the query or the user comment contains such words as "stay in San Francisco", or "stay near Golden Gate Bridge", and if the hotel advertiser does not pre-define keywords such as "stay", "Golden Gate Bridge", etc., as relevant, their ads may not be displayed, even though they can be highly relevant to the context.

However, using the system and methods disclosed in the present invention, even if the hotel advertiser only pre-defines relevant words such as "hotel", by checking concepts such as "travel", or "San Francisco", etc, with their corresponding association datasets, which will likely contain terms such as "flight", "hotel", "car rental", "stay", "sightseeing", etc., the relevance between the user query or user comment and the hotel advertisement can be discovered, and the related ads can be displayed to achieve desired results. The advertisement can be displayed as a banner advertisement at a web user interface or in a promotional email, etc. In this case, users can be better served, and more economical-financial benefits to the advertisers can also be achieved when compared to the conventional advertising methods without using the presently disclosed system and methods.

In some embodiments, the present invention can be used to determine the relevance between two or more text contents. For example, if the conceptual association dataset is about a job category or an employment domain, containing property terms such as job type, skills, and responsibilities, and one text content is a resume and another text content is a job description from an employer, and both contents are determined to be relevant to the job categories, then the system of the present invention can display or match the resume with the job description, even though the two contents may not contain the same keywords. For example, if the resume contains the keyword of "programmer", and the job description contains the keyword of "software engineer" without also containing the keyword "programmer", the conventional search methods may fail to find that the two contents can be relevant. However, with the system and methods of the present invention, the two contents can be determined to be relevant, and a match can be found. Generally speaking, contents other than the resume and job description can also benefit from the present invention, such as two documents using different keywords but related to a similar domain, or one content being a user expression of some kind, and the other content being an advertisement, such that if the two content are relevant to each other, appropriate advertisements can be displayed to the user.

Furthermore, in addition to determining the relevance between a text content and a concept or topic, and determining the relevance between two or more text contents as described above, in some embodiments, the present invention also provides methods for determining the relevance between two or more concepts or topics, as well as two or more objects or products or services, that are represented by their respective association datasets. For example, the present invention can determine the relevance or closeness of the concept of "computer" with the concept of "smart phone" by comparing their respective association datasets, each having its own property terms or corresponding association strength. For another example, the method can be used to answer questions such as "What products are similar to a computer?", or "Which person is similar to person X?", or "I am looking for a product that has similar functions or features to camera X", etc.

In some embodiments, the method is to count the number of property terms in one dataset that match the property terms in the other dataset. In some other embodiments, the method can also include the corresponding association strength in determining the relevance or semantic closeness or distance between the two concepts or topics. Other methods as described above in the present invention can also be used whenever applicable.

In addition to determining the relevance using a single conceptual association dataset one at a time, the present methods can be further extended to determine the relevance between a text content and a plurality of different conceptual association datasets in a single operation, and rank the concept or topic names in the output by their respective relevance scores to the text content.

This can be particularly useful for document classification or categorization, as well as for word sense disambiguation as described above, and other applications like targeted advertising. For one example of document classification, a single text content such as a regular document can belong to more than one categories depending on the content of the document. Instead of checking with different conceptual association datasets as different document class definitions one by one, the plurality of the datasets can first be organized into a data structure in the form either as a term-concept matrix or table, or an inverted index, similar to the format of a term-document matrix or an inverted index that are used in traditional document search or information retrieval, but with the elements being the conceptual association datasets in the present case, different from the documents in a database for search purposes.

In some embodiments, each dataset can be treated as a term vector, and the plurality of the term vectors representing the plurality of the concepts or topics can be organized into a term-concept or term-topic matrix, in which the values of the association strength will be zero for all terms that are not contained in a specific conceptual dataset. FIG. 13 illustrates the structure of such a term-concept or term-topic matrix.

In FIG. 13A, concept names are shown in 1310, and terms are shown in 1320. The values 1330 are either 1 or 0, indicating whether a term is a property term of the concept or not. In FIG. 13B, the values can be exemplarily between 0 and 1, indicating whether the association strength of the term is a property term of the concept or not. In some embodiments, the values can be either greater or smaller than the examples in FIG. 13B.

Figure 14:
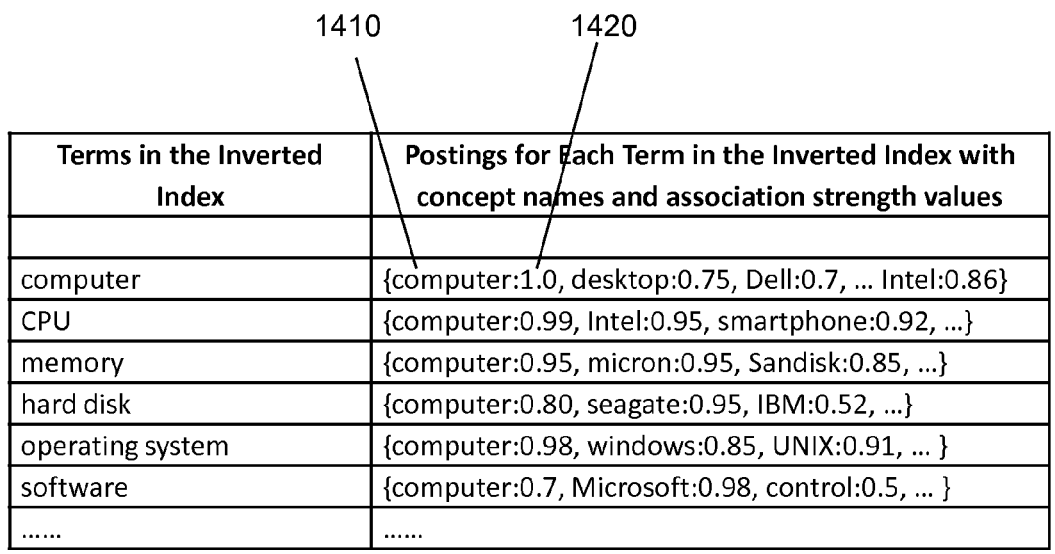

In some other embodiments, each dataset can be treated as a term vector, and the plurality of the term vectors representing the plurality of the concepts or topics can be merged into an inverted index of terms each with pointers to the concept dataset names that contain the term, and optionally, also to their respective association strength or weight values. In some embodiments, if the association strength value is below a threshold, the entry can be removed from the pointers to reduce storage space or processing requirements. Such pointers are sometimes known as postings in the index. FIG. 14 illustrates an exemplar structure of such a term-concept or term-topic inverted index, with concept names such as "computer", "desktop", "Dell", "Intel", etc. (1410), and their corresponding hypothetical association strength values (1420).

Figure 15:
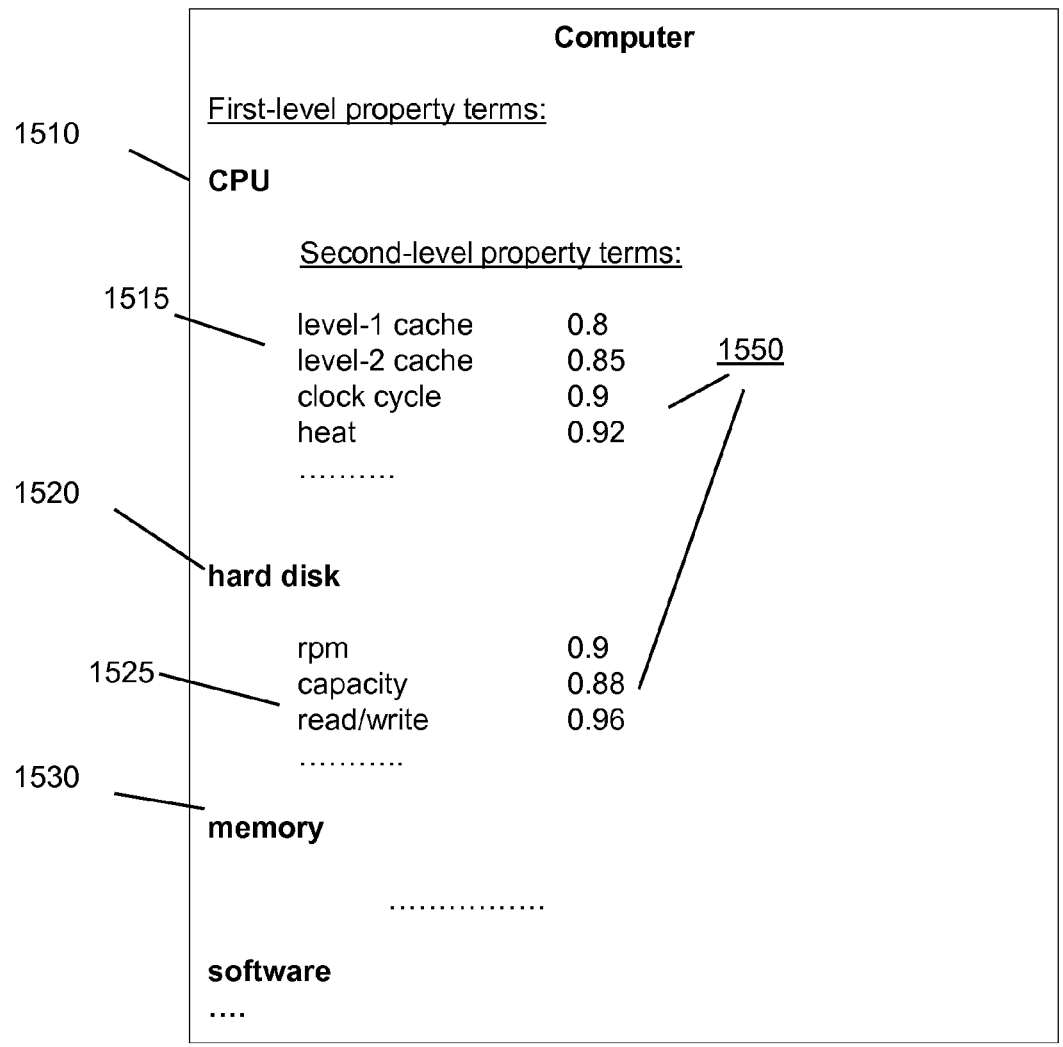

Furthermore, in some other embodiments, the multiple datasets can form a hierarchical structure representing different levels of association data. FIG. 15 is an exemplar illustration of the structure. In FIG. 15, one or more of the property terms (1510, 1520, 1530) in a dataset can have a second-level association dataset (1515, 1525), comprising one or more property terms that are associated with the property term on the first level. Like in the first-level dataset illustrated in FIG. 1, FIG. 6A and FIG. 6B, each second-level property term can also have one or more columns of corresponding association strength values (1550). The relevance determination methods described above can be recursively applied to each level for more accurate results when such datasets are available.

In yet some other embodiments, the property terms of a dataset can be stored separately, not necessarily in a list or column or row format, but stored as data points in any format linked with the concept or topic or object name or description.

More Embodiments for Providing Answers to a Question or an Unstructured Query

As described above, a query string can be treated as an unstructured text data, and a relevance score can be calculated between a query string and an object or concept dataset, and an object or concept name can be returned as an answer to the query. In the following, more embodiments are described for information search in the form of providing an answer to a query that may either be a keyword string, a question, or a statement.

Certain conventional methods for computer-assisted question answering require a sophisticated knowledge system with a huge number of records of exact facts and complex reasoning algorithms, which often renders such systems less effective for practical uses. In contrast, the presently disclosed association-based method can simulate certain aspects of a fuzzy process that is characteristic of human cognition, especially with the association strength being a non-binary mode representation of relevance measurement. Furthermore, the modular nature of the association datasets in representing discrete objects and their relations makes the knowledge acquisition process much more scalable than the conventional methods that require human efforts in manual data cleaning and ontology-building.

As described in the referenced disclosures, the object represented by the association dataset can be a physical or abstract object.

In addition to the exemplar property names illustrated in FIG. 1, in which the terms are mostly name of other objects, terms indicating other types of properties such as a state, a relation, an attribute, etc., can also be property names in the dataset. For example, phrases such as "is fast", "can create or view documents", "can play game", or "more affordable than 5 years ago", etc., can all be property terms in the dataset that represents the object or concept of "computer".

In U.S. Pat. No. 8,380,489 issued on Feb. 19, 2013, U.S. patent application Ser. No. 13/763,716 filed on Feb. 10, 2013, U.S. patent application Ser. No. 13/742,337 filed on Jan. 15, 2013, and U.S. patent application Ser. No. 13/802,427 filed on Mar. 13, 2013, systems and methods are disclosed for creating such object-properties association datasets using machine-learning methods. The methods can build various object-properties association datasets mainly from unstructured data as sources of information. The methods perform various types of analyses including grammatical, semantic, positional, internal and external frequencies, and other contextual and statistical analyses to build object-specific datasets that can effectively represent objects or concepts for various practical uses. The referenced disclosures are incorporated herein by reference.

Identifying a Name or Description of an Object or a Property in the Query String A query is a request for information. As described above, in natural language communications, information can be represented in the basic form of a simple declarative sentence with a structure of Subject+Predicate, for a corresponding information structure of Object+Property. In the present invention, a query string is a variation of such a basic structure. For example, in one case, a search query can be a statement, such as "I am looking for a product that can take pictures", which contains a main clause and a subordinate clause. In another case, a search query can be a question, such as "What product can take pictures?" In some other cases, a query can simply be one or more keywords, as is commonly seen with conventional search engines.

Based on the OPAM model of the present invention, if the query string contains a declarative sentence, such as the statement above, at least one simple declarative sentence can be identified, and its grammatical subject can be treated as the name or description of an object or concept, and its predicate or part of the predicate can be treated as the name or description of a property associated with the object. For example, in the subordinate clause of "a product that can take pictures" in the above sentence, "product" is the grammatical subject of the clause and can be treated as a name of an object or object class; and the phrase "can take pictures" is the predicate and can be treated as a name or description of a property associated with the object that is being queried.

When the query string is a question, the same methods can also be used to identify an object name or a property name that is being queried. Questions can be treated as being derived from its underlying declarative sentences, for the purpose of asking for information about either an object, or a property of a known object. For example, in the question "What is a camera?" the subject of the sentence is "camera", and the predicate of the sentence is the interrogative phrase of "what is", which can be regarded as being derived from a sentence such as "Camera is what", which, in fact, is how the same question is asked in many languages other than English, such as in the Chinese language. In such a case, the user is providing a known object name ("camera"), and asking for information about possible properties associated with the object. For example, the answer can be "a device that can take pictures", which provides the property of "can take pictures" as a piece of information about the object of camera as an answer to the query.

Questions can be of different types. In the English language, a question type like the above that involves a question word such as "what" is mainly used as queries for information, either about an object, or about a property associated with an object. Other types of questions include the so-called Yes-No question such as "Can a camera take pictures?" which expects a Yes/No answer to confirm whether the known object is associated with the known property. The so-called Or-question performs a similar function for confirming whether one of the two possible answers is correct, such as "Can this device take pictures or make a phone call?", in which the user provides a known object name ("this device") and two possible properties of "take picture" and "make a phone call", and asks for confirmation. In all these cases, what is not changed is that a question is asking for information either about possible properties associated with a known object, or about possible objects associated with a known property, or about a possible value of a known property; and the object name or the property name can be identified based on the sentence structure.

In addition to a statement or a question, a query can also be just one or a few keywords. In the present invention, a keyword-based query is a special case of a sentence-based query, and can be treated as an incomplete sentence that is missing certain parts that carry grammatical information.

Based on the Object-Properties Association Model of the present invention as described above, information is always about something (an object). Thus when the query string contains only a noun or noun phrase, it can be treated as being a grammatical subject of an incomplete sentence, with the predicate of the sentence being omitted, and therefore can be assumed that the user is looking for information about an object represented by the keyword. For example, if the user enters a word such as "camera", based on the Object-Properties Association Model of the present invention, it can be treated that the user is looking for information about the object of "camera", and what constitutes the information about such an object is one or more properties associated with the object.

In some other cases, a user may enter a query such as "can take pictures", or "take pictures". In such a case, the grammatical information associated with the words such as "can" or "take" can provide enough information that the query is a predicate in an otherwise complete sentence, with the subject of the sentence being omitted. And based on the OPAM model of the present invention, the predicate of a sentence represents a property associated with an object. Thus, the query can be interpreted as asking for information about objects that are associated with the property of "can take pictures". And in this case, objects such as "camera", "smart phone", and "tablet computer", etc., can be the objects if their respective datasets contain such a property name.

Given that a query string can be treated as a variation of a canonical sentence comprising a subject and a predicate, corresponding to an object and a property associated with the object, the analysis as described above can be used to determine whether a query is asking for information about a known object, or for information about unknown objects that are associated with a known property.

In addition to identifying the grammatical subject of a sentence and using it as an object name, certain noun phrases in non-subject positions can also be used as an object name, especially when such nouns or noun phrases are the focus of information in a question. For example, for a sentence such as "They like digital cameras", the phrase "digital cameras" is not the grammatical subject of the sentence, but may still be treated as representing an object name. Furthermore, it is a complex phrase with a head "camera" and a modifier "digital", and based on the object-properties relationship between a head and a modifier in a complex phrase as described above, the word "camera" can be an object name, and the word "digital" can be a property name.

The method of analyzing a query string by identifying the head-modifier relationships in the query string can be applied to other types of search where queries are generally keyword-based, but a head-modifier relationship can be identified between the terms in the query. Furthermore, different terms in a query string can be assigned different weight values using the term importance calculation methods described above based on the grammatical, semantic, and other contextual attributes associated with the terms in the query, and such weight values can be used in determining the relevance of the search results.

In some other embodiments, whether a term can be treated as representing an object or a property of an object can be determined by identifying the semantic or contextual attributes. For example, if a user enters a query such as "excellent", the term can be treated as being equivalent to a predicate based on its being an adjective, and semantically referring to an attribute of something, and thus representing a property of an object.

Furthermore, whether a term refers to an object or a property of an object can also be determined by searching the available object or conceptual datasets, and if the term matches the name or description of a dataset, it can be treated as representing an object; or if the term matches the name or description of a property in a dataset, it can be treated as representing a property of the object. In case a term matches both an object name and a property name of another object, additional methods can be used to further reduce the ambiguity.

These methods are in contrast to a conventional database query performed by using what is known as the "Structured Query Language". In the present disclosure, the methods are for queries in the form of an unstructured text string, or in natural language format, such as a question, a statement, or one or more keywords. Furthermore, the object-properties association dataset is also different from conventional relational or non-relational database formats. For example, the conventional structured database tables by their very nature of being "structured" have fixed number of columns for all rows in a table, typically with the value of an attribute stored in the cells. However, for an object such as "computer", entries such as "can create or view documents", "can play game", or "more affordable than 5 years ago", etc., are typically not part of such structured databases. And the association strength as a fuzzy measure of importance or the defining power of the values in the columns is not an inherent part of the structured data representation by its very nature.

Retrieve and Display an Object Name or Property Name as an Answer to the Query

For a given query string, if it can be determined that the query is seeking information about an object, and an object-specific dataset for that object is available, the dataset can be retrieved from storage by a computer processor or a processing system coupled with a storage device or a memory module, and one or more properties associated with the object can be displayed in a user interface as an answer to the query.

For example, the query string can be "What is a computer?" or "What can a computer do?" in which the term "computer" can be identified as the grammatical subject, and the query can be identified as searching for information about the object of computer. If an association dataset representing the object of "computer" is available, it can be retrieved; and one or more of the properties in the dataset, such as "has a CPU", or "can create documents", or "can play multimedia files", etc., can be selected as providing information about the object of "computer", and can be displayed in a user interface on or connected to a computing device as an answer to the query.

In some embodiments, properties can be selected from the dataset based on the values of their association strength or some other importance measure. For example, only the properties of which the association strength values are above a predefined threshold are selected for retrieval. Furthermore, when displayed, the selected properties can be ranked by the association strength values, and the more defining properties or features can be displayed first for more effective information presentation.

In some embodiments, the selection can be performed before the dataset is used, thus the object dataset can contain only pre-selected properties of which the importance values or the association strength values are above a threshold based on certain criteria, and thus may not need to be attached to the property terms in the dataset.

Figure 16:
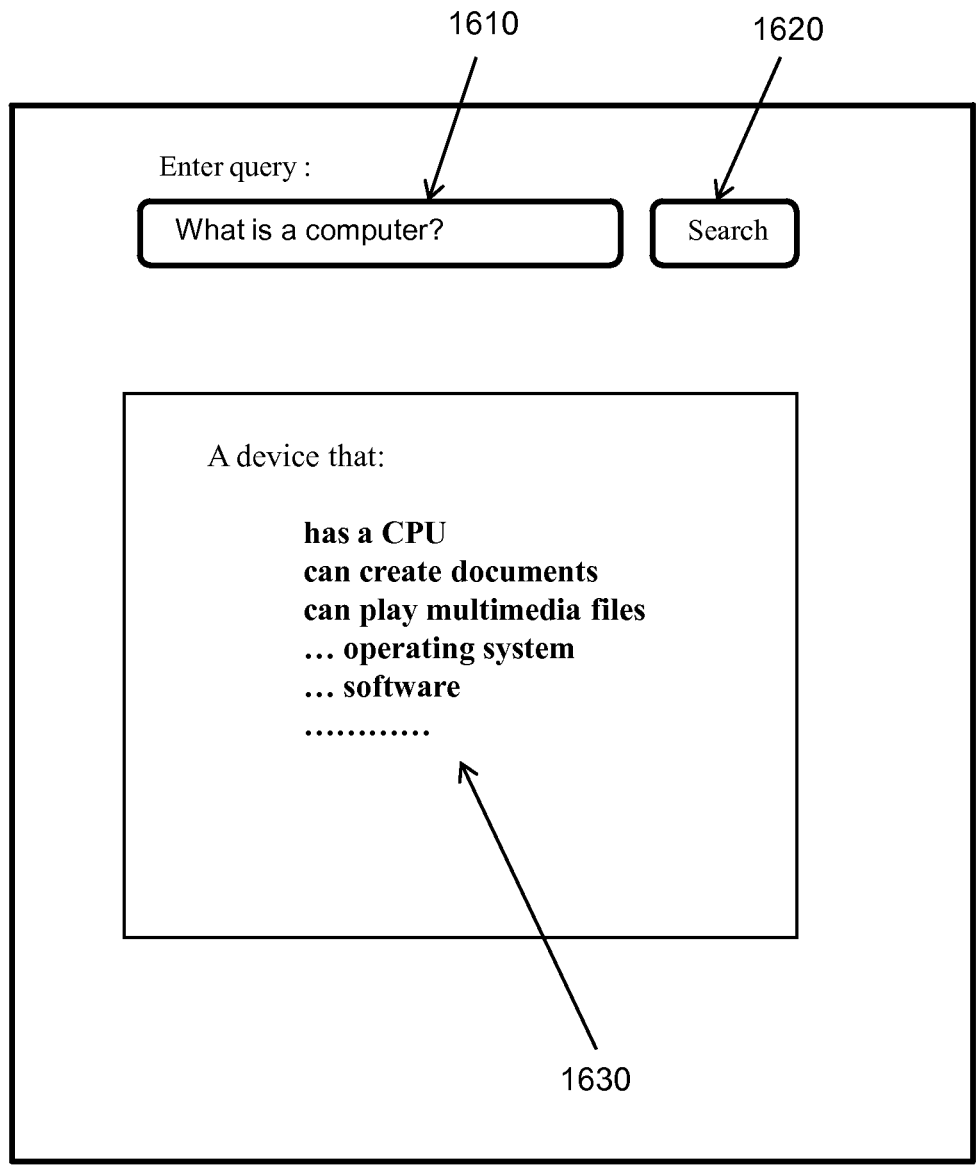
FIG. 16 is an exemplar user interface illustrating displaying properties of an object as an answer to a query about an object.

FIG. 16 illustrates an exemplar user interface for accepting a query as an object name and displaying the properties of the object as an answer to the query.

In FIG. 16, a natural language query "what is a computer" is entered in the query box (1610). The term "computer" is identified as the grammatical subject of the question, and is treated as a name of an object. When a search action is performed (1620), the association dataset for the object of "computer" is retrieved, and the top-ranked or the most important properties associated with the object of computer (1630) are selected and displayed in the user interface. As described above, in addition to the natural language question, a keyword-based query such as "computer" can also produce the same result when the word "computer" is identified as an object name when the query is an incomplete sentence.

In some embodiments, additional words or phrases can be added to make complete sentences that include the selected property terms. For example, if the query is "What is a computer?" instead of just displaying the property term of "has a CPU", or "can create documents", etc., complete sentences can be created based on the query and the property terms, such as "A computer is a device that has a CPU, and can create documents." etc.

In some embodiments, two or more object names can be identified in the query, and their corresponding property names or descriptions can be output to a user interface as answers to the query. For example, when the object names are two comparable products or services or persons or organizations, etc., such as when the query contains a question like "What are the differences or similarities between a notebook computer and a tablet computer?" or a string like "notebook computer and tablet computer", the property names or descriptions based on the property names for the two objects can be returned to the user as an answer to the query.

In addition to the type of query requesting information about a known object as described above, in some other embodiments, it may be determined that the query is for information about an unknown object with a known property. For example, a user may enter a query such as "I am looking for something that can play multi-media files", or "I am looking for something that can edit documents", or "What can play multi-media files?" etc., in which, terms such as "can play multi-media files", or "can edit documents", can be identified as a predicate of a sentence, and thus representing some known properties of some unknown objects, in contrast to the above examples of representing a known object.

If one or more object-specific datasets containing such property terms are available, they can be retrieved and the names of the objects or their descriptions can be returned to the user as an answer to the query. For example, one or more datasets, such as the ones for the objects of "computer", or "desktop computer", or "tablet computer", etc., may likely contain one or more of such property terms, and the dataset for the object of "smart phone" may also likely contain one or more of such property terms. In such cases, the object names of "computer", or "desktop computer", or "tablet computer", or "smart phone", etc., can be returned and displayed in a user interface as answers to the query.

Also as described above, in the datasets, properties can have association strength values, representing their importance or defining power to the object. When there are multiple objects containing the queried property terms, the objects can be selected based on the value of the association strength of the property term in each of the object-specific datasets. In certain cases, the queried property term can be more defining for one object than for another, and for some objects the property term's association strength may be negligibly small. In such cases, a threshold can be predefined, and only those objects in which the property terms' association strength or importance value is above the threshold may be selected and displayed in the user interface as answers to the query.

Figure 17:
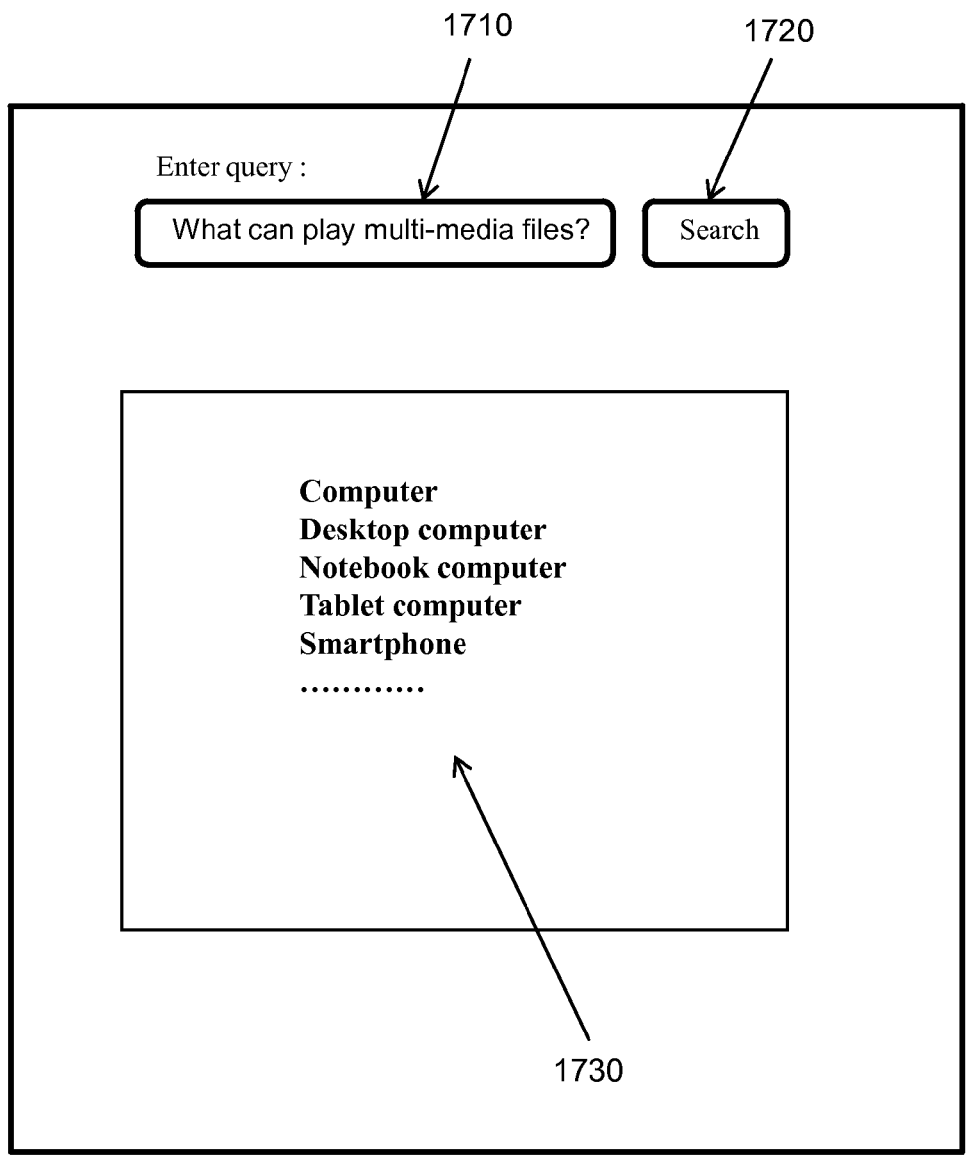
FIG. 17 is an exemplar user interface illustrating displaying names of object as an answer to a query about a known property.

FIG. 17 illustrates an exemplar user interface for accepting a query as a property name and displaying the names of object that have the queried property as an answer to the query.

In FIG. 17, a natural language query "what can play multi-media files" is entered in the query box (1710). The term "can play multi-media files" is identified as a grammatical predicate of the question, and is treated as a name of a property of an object. When a search action is performed (1720), object-specific datasets for the objects such as "computer", "desktop computer", "notebook computer", and "smart phone", etc., can have a property term matching the term of "can play multi-media files", and the names of such objects (1730) are selected and displayed in the user interface. As described above, the property term of "can play multi-media files" may have different association strengths with different objects, and object names can be ranked by the association strength value when displayed. Also as described above, in addition to the natural language question, a keyword-based query such as "can play multi-media files" can also produce the same result when the term "can play multi-media files" is identified as a property name of an object name.

In some embodiments, the input query string can either be in text format or speech format, or be converted from speech input; and the output answer can either be in text format for display in a visual format, or be converted to speech for output in an audio format.

Providing Contextual Information to Facilitate Search

In addition to providing the object names or property names as answers to queries, the relevant object names or property names can also be used as contextual information for general-purpose search.

In U.S. Pat. No. 8,498,983 entitled "Assisting Search with Semantic Context and Automated Search Options", system and methods are disclosed for identifying and displaying context terms based on the queried terms and the topic distribution in the documents containing the queried terms in the document repository. The context terms can represent various topics of the documents in the repository being searched, and the user can select one or more of the topic terms as the intended context of the queried terms to quickly find the most relevant documents by narrowing down the scope base on the context terms as suggestions or hints. The disclosures in this referenced patent and its related applications are incorporated herein by reference.

In addition to the topic-based context terms, names or descriptions of objects or properties can also be displayed as context terms to facilitate the search. For example, if the query is "computer", and if the association dataset for the object of "computer" is available, one or more properties associated with the object of "computer" can also be displayed in the user interface. For example, property terms such as "CPU", "software", etc., as illustrated in FIG. 1 and others, can be displayed. This is particularly useful in providing suggestions for searching related information when such property terms are not contained in the original query string. When the user selects one or more of the property terms, the selected property names can be used as additional query terms, and documents or links to the documents that contain information about the selected properties can be retrieved and displayed and ranked higher, and the user can avoid having to going through a long list of search results.

Furthermore, similar to the referenced disclosure, when the property terms selected by the user matches another object dataset, the properties or other object names can be displayed as a second-level search suggestions, and when the user selects a property name on the second level, the property name can be used as another query term to further narrow down the search scope. Overall, users can select one or more of such objects or properties names to retrieve more related information in other object datasets. This can not only provide many functions of an otherwise conceptual or object graph, but can also make such a graph easily browsable, both in a modular fashion.

Also similar to the referenced disclosure, user interface objects can be provided to allow the user to further indicate the importance of each property displayed in the user interface, and the search engine can adjust the search results based on the user indication.

Figure 18:
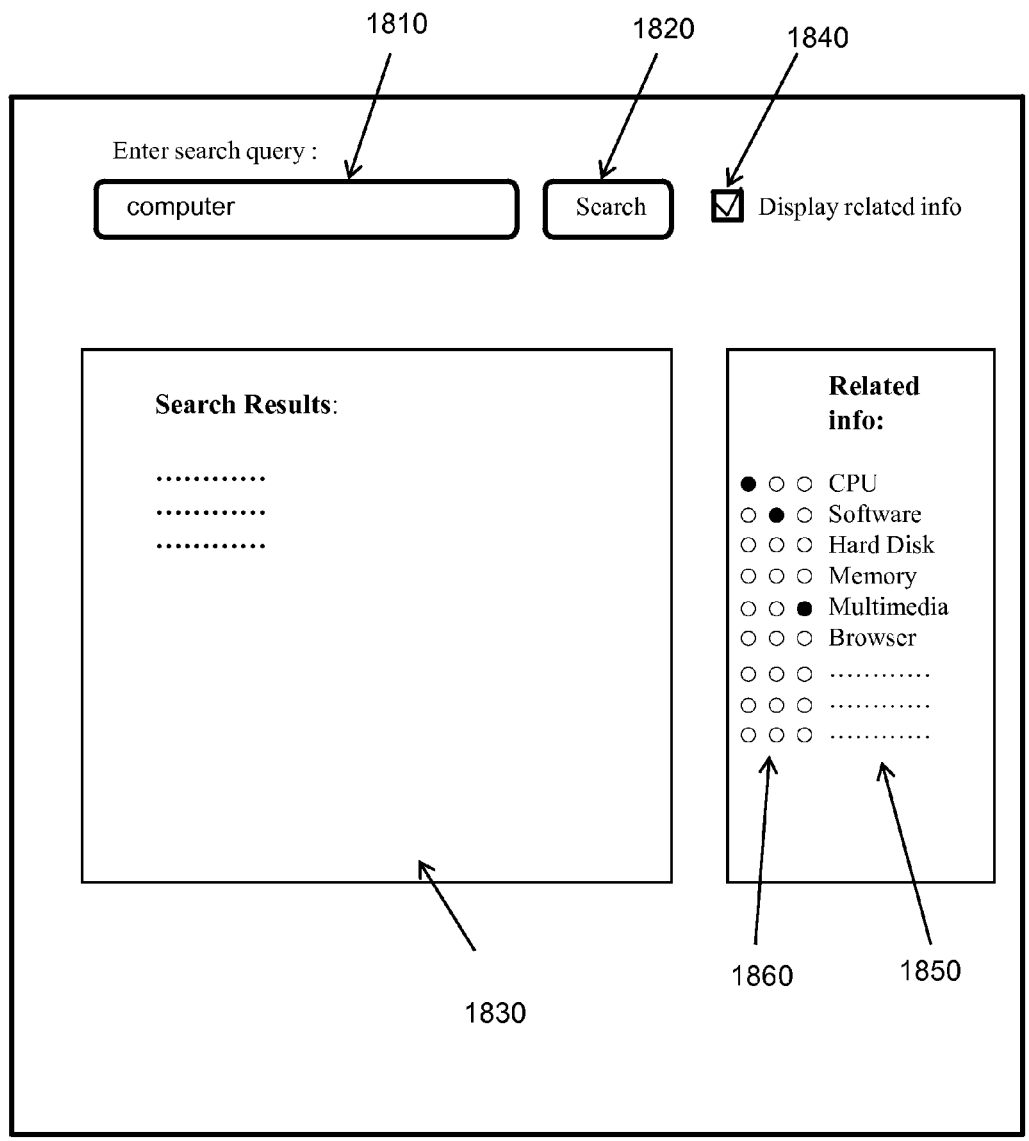
FIG. 18 is an exemplar user interface illustrating displaying properties of an object as information related to a query about an object to assist a search.

FIG. 18 illustrates an exemplar result of displaying property terms when the search query is identified to contain an object name, and with optional user interface objects for users to indicate the importance of a property term in narrowing down the search results.

In FIG. 18, a query term of "computer" (1810) is entered, and when the search action is performed (1820), search results (1830) can be displayed, which can be documents or links to documents that contain the keyword "computer". In addition to this type of conventional results, a user can enable to display related information by acting on a user interface object (1840). The term "computer" can be identified as an object name with a matching dataset containing properties associated with the object of "computer", and some of the property terms (1850) can be selected and displayed in the user interface as information related to the queried object "computer". A user can select a property term as an additional query term and perform another search. And optionally, the user can also use the interface objects (1860) to indicate an importance of the property term when performing a new search and ranking the new search results.

In addition to the above example case when the queried term is an object name thus the most important or defining properties of the object are selected and displayed, in some embodiments, the queried term can be identified as a property name, such as "can take pictures", the names or descriptions of objects that have such a property can be displayed as a context terms. Furthermore, in some embodiments, the objects can be selected based on the association strength values of the properties, and be rank-ordered when displayed in the user interface.

In addition to using the names or descriptions of objects or properties as answers to queries as described above, the system and methods of the present disclosure can also be used for making recommendations. For example, a user may talk to a computer system with expressions like "I want to eat fried chicken". In such a case, when association datasets are available for various restaurants as objects, then restaurants that serve fried chicken can be identified and presented to the user. For certain restaurants that specialize in fried chicken, the property or feature of serving fried chicken can be a more defining property, and thus can have larger values of association strength in the association datasets for such restaurants, and thus can be selected as recommendations and be ranked higher than other restaurants that also serve fried chicken but only as a minor item on the menu.

Creating Object-Properties Association Datasets from Unstructured Data

In addition to the system and methods for creating object-properties association datasets in the referenced disclosures, where the object name is usually pre-defined, an object dataset can be created based on any given text content as unstructured data source, and can then be used for various purposes.

In some embodiments, for a given collection of unstructured text data, one method for creating an object-properties association dataset is to first identify a sentence in the data source, and treat the grammatical subject as an object name, and select a part or the whole of the predicate of the sentence as a name or description of the object, and optionally, determining an association strength based on the context of the property term in the sentence or its frequency in the data source.

This method can dynamically create various object or conceptual datasets for a given unstructured text content or a collection of such text contents, and then be used for answering questions based on the information extracted from such contents. The datasets so created can also be used as a structured or semi-structured representation of the content in the unstructured data set.

For example, suppose the unstructured data is a collection of user reviews on a restaurant. Some reviews may contain sentences such as "The food is excellent." Others may say "The food is delicious.", "The service is poor", or "Parking is crowded". Using the methods of the present invention, terms associated with the grammatical attribute of being a subject of a sentence can be identified, such as "food", "service", and "parking"; and terms associated with the grammatical attribute of being a predicate of a sentence can also be identified, such as "excellent", "delicious", "poor", and "crowded". Based on these, object datasets can be created based on the subject terms, with each term as an object, and with the terms in the corresponding predicate as property terms associated with their respective objects. Once the datasets are created, a user can ask a question such as "How is the food?", or "What is the food like in this restaurant?" in which the term "food" can be identified as an object name with a matching object dataset in the system, and the search engine can retrieve the properties associated with the object "food", such as "excellent", and "delicious", and display such property terms in the user interface as an answer to the question. If there are more reviews that mention the food as being "delicious", then the association strength of the property term "delicious" will have a larger value than that of "excellent", and thus will be ranked higher than the property of "excellent" when displayed as an answer, as described above.

On the other hand, a user can also ask a question such as "What is poor about this restaurant?" and the term "poor" can be identified as a property name based on its grammatical attribute of being a predicate of the sentence, and the object name associated with this property can be retrieved and displayed to the user as an answer to the question, which in this particular example, is "service". And if the user's question is "What is excellent about this restaurant?" then the object name of "food" can be retrieved and displayed as an answer.

One advantage of the present invention over the conventional keyword-based search is that it does not need to return a list of many reviews as different documents that contain the keyword and then require the user to read these documents. In contrast, it can directly return a simple and relevant answer, saving the user much effort in reading through a long list of documents.

Another advantage of the present invention is that it also allows the user to ask a natural language question as a search query.

As described above, the object-properties relationships can also be represented by a complex phrase comprising a head term and one or more modifier terms, or two or more sub-components in such a multi-word phrase. For example, phrases such as "Chinese food", "Japanese food", Mexican food", etc., are complex phrases comprising the head term "food", and "Chinese", "Japanese", and "Mexican" as modifiers. When each phrase is a subject term, the whole phrase can be an object name, such as the whole phrase of "Chinese food". On the other hand, the head term "food" can also be another object name for the purpose of creating a dataset, or adding to an existing dataset, with modifiers as its properties.

In the above case, a dataset named "food" can be created, with terms such as "Chinese", "Japanese", and "Mexican" as its properties. An exemplar representation of such a dataset can be {food: ["Chinese", "Japanese", "Mexican"]}. It can serve queries such as "What food do they serve?", etc., by displaying the property terms such as "Chinese", "Japanese", "Mexican", as an answer or part of an answer.

When the object dataset is based on the head-modifier relationships in a phrase, the phrase itself does not need to be a subject of a sentence as in the canonical form of object-properties relationships described above. The phrase can also be a part of the sentence that is not a subject, such as a verb object, or the noun phrase in a prepositional phrase, etc. In some embodiments, a simple phrase can be treated as a special case of a complex phrase consisting of only a head without a modifier. In such cases, the object dataset can be based on simple noun or noun phrase, which can include a noun or noun phrase in any position in the sentence, with the other terms in the sentence as its property terms. For example, if a text content contains two sentences such as "John wrote a book in English", and "May wrote a book in French", a non-subject term, such as the term "book", can be treated as the name of an object, and other terms in the sentences can be treated as properties associated with the object of "book", and a dataset can be created to represent the relationships, such as in a dataset like {"book": ["John", "Mary", "in English", "in French", . . . ]}. If the query is "In what languages are the books?", property terms such as "in English" and "in French" can be retrieved from the dataset as answers.

Figure 19:
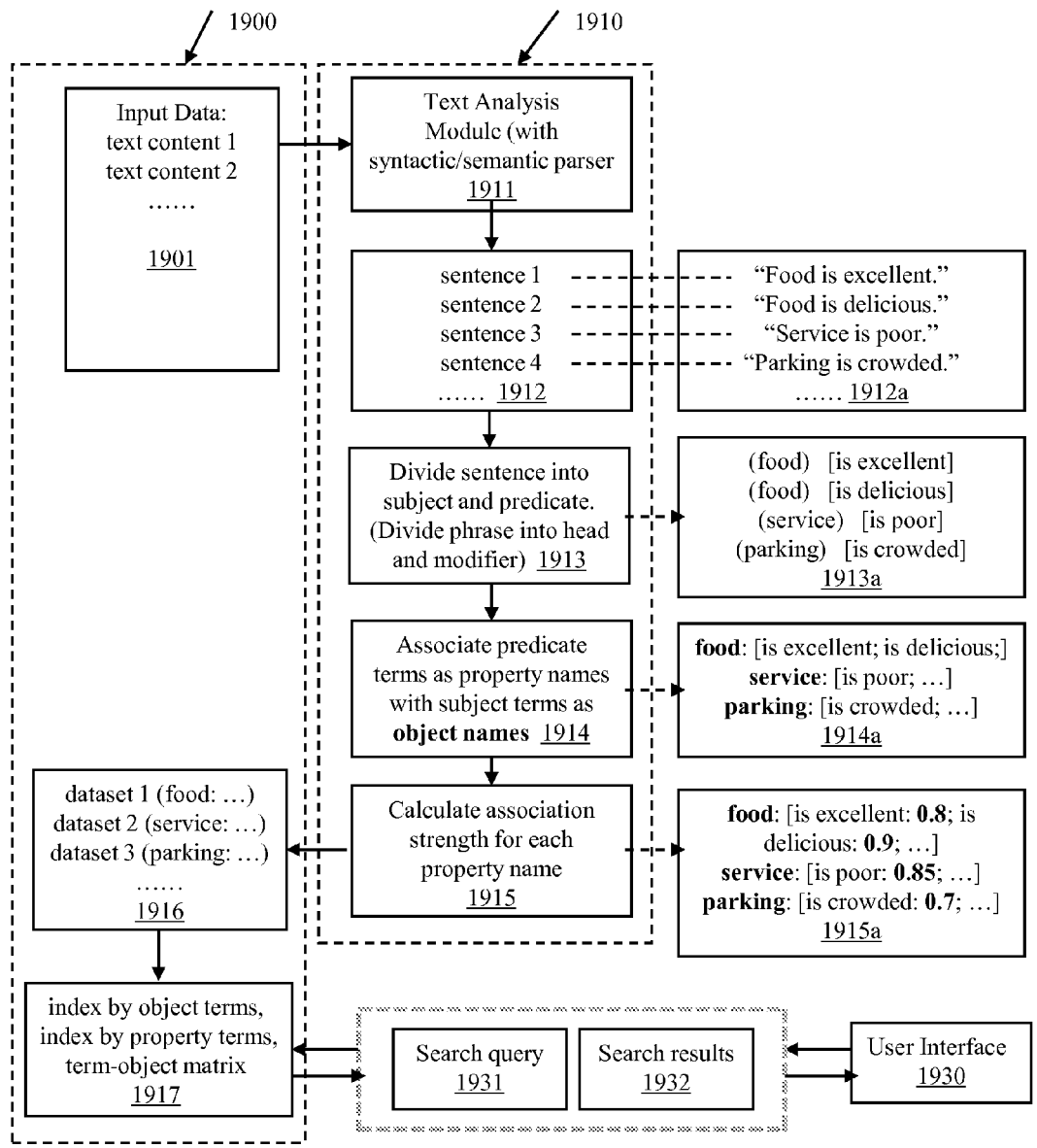
FIG. 19 is an exemplified system diagram for producing object-specific datasets from unstructured data using the methods of the present invention.

FIG. 19 is an exemplified system diagram and processing steps for producing object-specific datasets from unstructured data using the methods of the present invention.

In FIG. 19, the system includes a computer processing system 1910, a computer storage system 1900, and a user interface 1930. The computer processing system 1910 includes text analysis modules 1911-1915 for creating object datasets from the unstructured data sources 1901. The computer processing system 1910 can be implemented as, but not limited to, a central processing unit, an application-specific computer processor, a network server, and a group of computer processors. The computer processing system 1910 can be implemented on a device that has computation power, for example, a personal computer, a portable computer, a mobile device such as a smart phone, a computer network system comprising servers and processors that can provide information service to a remote server or client machine, and a cloud computing system. The computer storage system 1900 can store input data 1901, which include various types of document data comprising one or more documents as text contents. The text contents can include any text in any language, such as a web page, a menu, a book, an email, a text message, an article, a dictionary, an instruction manual, a social media or blog comment, etc. The computer storage system 1900 can be implemented in many types of storage media based on magnetic, optical, and mechanical properties, and nano materials, which can include a hard drive or an array of hard drives, flash memory, optical disks, and magnetic tapes. The user interface 1930 can be provided, for example, by a program installed on a computer, a web browser, or an application for mobile devices.

The module 1911 in the computer processing system 1910 receives input data. The text analysis module includes algorithms that can function as a syntactic or a semantic parser. The input text contents are first broken into sentences 1912. Then each sentence is divided into a subject term and a predicate term, where the predicate term can be the portion of the sentence that is not the subject. Optionally, phrases in the subject and the predicate can further be broken down into a head of the phrase and one or more modifiers, as described above in the referenced disclosures. Then, each predicate term is associated with its subject term, with the predicate term representing a property associated with the object represented by the subject term 1914. Optionally, (not shown in the steps), a modifier can be associated with the head term of a phrase, with the head term representing an object, and the modifier term representing a property associated with the object. Then, association strength values can be calculated to represent the strength of association or the importance of a property to the object 1915. 1912a, 1913a, 1914a, and 1915a show example results of the corresponding steps.

As described above, the association strength can be determined based on various attributes, including the frequency of the property term in the text contents, and the grammatical, semantic or other contextual attributes associated with the property term.

Once the input text contents are processed, the datasets created from the above steps can be output for various uses, and can be stored in computer storage media 1916. The datasets can be stored in the forms such as the ones illustrated in FIGS. 1, 6A, 6B, and 12-15, as representations of the original unstructured text contents 1917.

The datasets can be indexed by object term such that when a search query 1931 is for a known object, the property terms can be returned as answers to the query 1932. The datasets can also be indexed by property terms such as when a search query is for an object with a known property, the object terms can be returned as answers to the query, as described above. Furthermore, a term-object matrix can be created based on the datasets in a form such as exemplified in FIGS. 13A and 13B.

Figure 20:
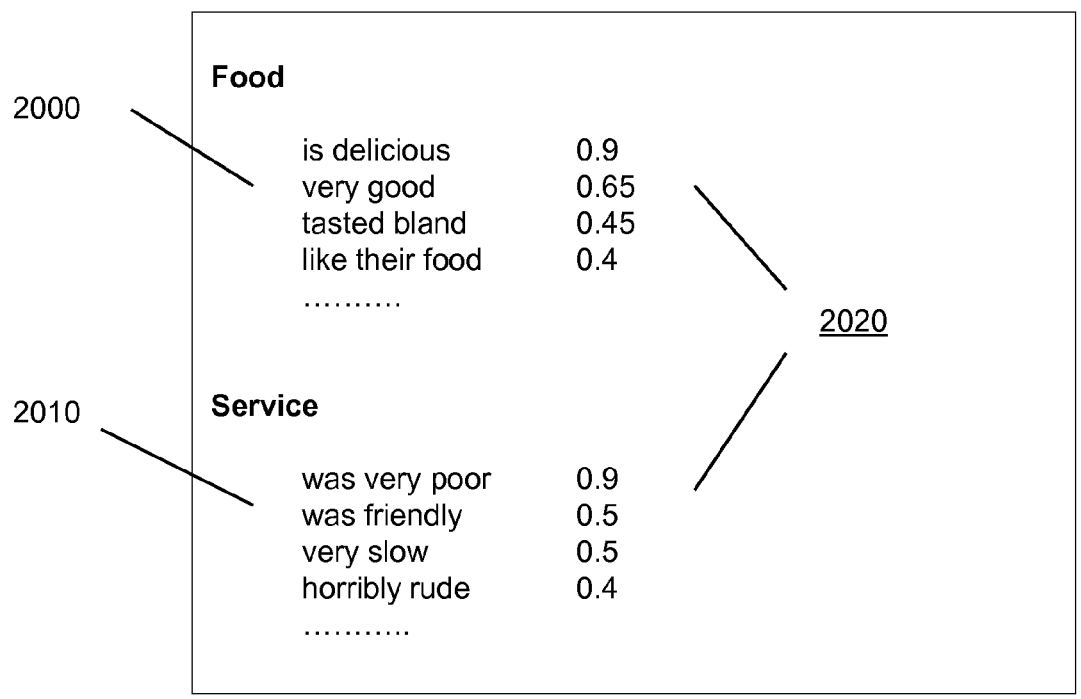
FIG. 20 is an example of object-properties association datasets created from a collection of social media reviews as an unstructured data source.

FIG. 20 is an example of two object-properties association datasets created by the system illustrated in FIG. 19 from a collection of social media reviews on a restaurant, with more data than the examples in FIG. 19. In FIG. 20, one exemplar dataset is based on the object name of "food" (2000), and another is based on the object name of "service" (2010), each with exemplar association strength values for its property terms.

The collection of the datasets, together with the indexes of object or property terms, and the term-object matrix, can be a structured or semi-structured representation of the original unstructured text content, as compared with the conventional method of a term vector or a term-document matrix for representing the same text contents.

In general, any number of text content containing at least a grammatical sentence of a language can be represented in such a way. Text data are commonly known as "unstructured data". On the surface, the text data in a document are a flat string of characters. They are considered as unstructured when compared with the data in a database that are well-structured by predefined tables. However, it is also well known that text in any language has linguistic structures, such as the grammatical structure, as well as semantic structure. The present invention identifies the structural relationships between the words or phrases used in the text content from an information point of view, and represents an information structure of the text content by creating one or more object-properties association datasets based on any given text content, which can further enable more effective information retrieval and presentation.

As described above, the object-properties relationships can be captured by identifying the grammatical relationships between the grammatical subject and predicate in a sentence, as well as between the head and its modifiers in a complex phrase. All these attributes can be used to build one or more object-specific datasets based on a given text collection, as a structured or semi-structured representation of the unstructured text collection.

When compared with the conventional approaches of representing a document in the form of a term vector, and representing a document collection in the form of a term-document matrix, an approach also known as the "bag-of-words" approach, the present invention provides a novel method of representing either a single document or a document collection by constructing one or more object-properties association datasets. In the present invention, whether a term represents an object or a property of an object can first be identified by the grammatical or other contextual attributes associated with the term, and the relationships between the terms can be represented by treating a term either as an object name or a name of a property associated with an object. Thus, one or more of such object datasets can be used as an informational and structural representation of the document, or a multi-document collection. With such a representation, unlike the conventional term-document matrix, much more information can be captured and readily retrieved for various information needs, including providing specific answers to questions based on information from unstructured data, in addition to the conventional keyword-based search.

More Applications of the Above Methods

The system and methods of the present invention can be applied to a wide array of uses cases.

The example in FIG. 19 illustrates a use case of searching information from a large number of social media contents such as product or service reviews. Similar cases of this type of application can include enterprise internal documents of various types. One example is the technical or customer support documents.

A company may have accumulated a large number of technical support documents. In the conventional method of keyword-based search, a user enters a keyword and the system returns a list of search results containing the keyword. In such a case, the user will have to read the documents one by one to find whether one of the documents contains the needed information. In contrast, using the methods of the present invention, the unstructured document collection can be treated as a collection of training data, and the documents can be analyzed using the methods illustrated above to create one or more object-properties association datasets as a structured or semi-structured representation of the unstructured documents, which can then be used to answer user queries by providing answers to the questions rather than providing a list of documents that require the user to make further effort in finding information they are looking for in the documents.

Furthermore, the system and methods of the present invention can be applied to other information retrieval cases.

As described above, an object in the present invention can be any object, including a physical object, such as a person, a company, a product or service, a sound, a scene, etc., or a mental object such as an idea, a concept, a topic, or an interest, etc. The methods disclosed in the present invention can be applied to any of such objects.

In some embodiments, the object is a product or a service. In addition to searching for what a product or service is, a typical use case is to search an unknown product or service by a known or desired function or feature, without knowing what the product or service's name is. The above examples with the object of "camera" or "computer" are instances of such use cases. When object-properties association datasets can be created using the methods described above, especially from unstructured data as information sources, such as web pages, articles or blogs, books, social media comments, etc., a user can query the system by a question such as "What can take pictures?" or an incomplete question or sentence such as "take picture" or "can take picture", etc., and the system can return object names such as "camera", "smart phone", or "tablet computer", etc., as answers.

In some embodiments, the object is an organization such as a company or a group of companies. Once an object-properties association dataset can be created using the methods described above, a user can query the system by a question such as "Which company makes smart phones?" or "I am looking for a company that makes smart phones", and the system can return company names such as "Apple", "Samsung", or "Google", etc., as answers.

In some embodiments, the object is a person or a group of persons. Once an object-properties association dataset can be created using the methods described above, a user can query the system by a question such as "Which senator talked about immigration reform?", and the system can return the names of those senators who talked about immigration reform.

In some embodiments, the object is a job position. Once an object-properties association dataset can be created using the methods described above, a user can query the system by a question such as "I am looking for a job that can use my accounting skills", and the system can return appropriate job or position names as answers instead of returning a list of job descriptions.

Other types of objects, such as a book, an image, etc., can also be the type of objects that can be queried using the methods of the present invention.

An advantage of the methods in the present invention is that unlike conventional search methods that usually require the user to specify the name of the thing to be searched for, in the present invention, a user does not need to know the name of the thing to be searched for. The user can search for that thing as long as he/she knows something that is associated to it.

It should be understood that the above-described methods are not limited to the specific examples used. Applications of the presently disclosed system and methods are not limited to the above examples, either. The system and methods can be applied to various types of computing devices or platforms, including fixed, portable, or mobile or cloud-based devices, media, and platforms. Configurations and processes can vary without deviating from the spirit of the invention.

What is claimed is:

1. A computer-implemented method for searching information, comprising:
    receiving a query in a non-structured query language format comprising a text format or speech format;
    identifying a first term in the query;
    receiving an object-specific dataset associated with an object, wherein the object includes a physical or conceptual object or an object class, wherein the object and the object-specific dataset are associated with a name or description represented by a second term, wherein the object-specific dataset contains at least a third term, wherein the third term represents a name of a property associated with the object, or represents a term associated with the second term, wherein the third term is obtained from a text content containing a sentence associated with the second term using an automated text analysis method, wherein the third term is associated with an importance measure, the importance measure indicating the importance of the property in relation to the object, or serving as a criterion for including the third term as a term in the object-specific dataset;

comparing the first term with the third term;
if the first term matches the third term,
selecting the second term; and
outputting, in a text or speech format, the second term representing the object name or description at least in part as an answer to the query.

2. The method of claim 1, wherein the object is a product or service or a person or an organization, wherein the property is a feature or function or attribute of the product or service or person or organization.

3. The method of claim 1, wherein two or more object-specific datasets are received, and the first term matches a third term in two or more object-specific datasets, and wherein two or more second terms representing two or more object names or descriptions are output as answers to the query, the method further comprising:
    ranking the two or more object names or descriptions based on the importance measure.

4. The method of claim 1, wherein the automated text analysis identifies the grammatical attributes of the terms in the sentence, wherein the grammatical attributes include grammatical roles and parts of speech associated with a term in the sentence.

5. The method of claim 4, wherein the grammatical roles of the terms in the sentence include a grammatical subject, a predicate comprising the non-subject portion of the sentence, a multi-word phrase, a sub-component in a multi-word phrase, a head in a phrase, and a modifier in a phrase.

6. The method of claim 5, wherein the second term is a term associated with the grammatical role of a subject of a sentence, wherein the third term is a term associated with the grammatical role of a predicate or part of a predicate comprising the non-subject portion of the sentence.

7. The method of claim 1, wherein the importance measure of the third term is determined based on the frequency of the third term associated with the second term.

8. The method of claim 1, wherein the importance measure of the third term is determined based on the contextual attributes of the third term, wherein the contextual attributes include grammatical, semantic, and positional attributes associated with the third term.

9. The method of claim 1, further comprising:
    identifying the first term in the query as a term representing a property associated with an object based on a grammatical role associated with the first term, wherein the grammatical role includes the first term being in a non-subject portion of a sentence in the query.

10. A computer-implemented method for searching information, comprising:
    receiving a query in a non-structured query language format comprising a text format or speech format;
    identifying a first term in the query;
    receiving an object-specific dataset associated with an object, wherein the object includes a physical or conceptual object or an object class, wherein the object and the object-specific dataset are associated with a name or description represented by a second term, wherein the object-specific dataset contains at least a third term, wherein the third term represents a name of a property associated with the object, or represents a term associated with the second term, wherein the third term is obtained from a text content containing a sentence associated with the second term using an automated text analysis method, wherein the third term is associated with an importance measure, the importance measure indicating the importance of the property in relation to the object, or serving as a criterion for including the third term as a term in the object-specific dataset;
    comparing the first term with the second term;
    if the first term matches the second term,
    selecting the third term; and
    outputting, in a text or speech format the third term representing the property associated with the object at least in part as an answer to the query.

11. The method of claim 10, further comprising:
    outputting a description of the object based on the selected property names.

12. The method of claim 10, wherein the importance measure of the third term is determined based on the frequency of the third term associated with the second term.

13. The method of claim 10, wherein the automated text analysis identifies the grammatical attributes of the terms in the sentence, wherein the grammatical attributes include grammatical roles and parts of speech associated with a term in the sentence.

14. The method of claim 13, wherein the grammatical roles of the terms in the sentence include a grammatical subject, a predicate comprising the non-subject portion of the sentence, a multi-word phrase, a sub-component in a multi-word phrase, a head in a phrase, and a modifier in a phrase.

15. The method of claim 14, wherein the second term is a term associated with the grammatical role of a subject of a sentence, wherein the third term is a term associated with the grammatical role of a predicate or part of a predicate comprising the non-subject portion of the sentence.

16. The method of claim 10, wherein the importance measure of the third term is determined based on the frequency of the third term associated with the second term.

17. The method of claim 10, wherein the importance measure of the third term is determined based on the contextual attributes of the third term associated with the second term, wherein the contextual attributes include grammatical, semantic, and positional attributes associated with the third term.

18. The method of claim 10, further comprising:
    identifying the first term in the query as a term representing an object based on a grammatical role associated with the first term, wherein the grammatical role includes the first term being a grammatical subject of a sentence in the query.

* * * * *